US007740221B2

(12) United States Patent
Sheffield, Jr. et al.

(10) Patent No.: US 7,740,221 B2
(45) Date of Patent: Jun. 22, 2010

(54) SUCTION-MOUNTABLE DISPLAY DEVICE HAVING A PERIPHERY AND A BEND ADJACENT THE PERIPHERY

(76) Inventors: Douglas M. Sheffield, Jr., 8 Ridge Crest Dr., Chesterfield, MO (US) 63017; Tamara K. Sheffield, 8 Ridge Crest Dr., Chesterfield, MO (US) 63017

( * ) Notice: Subject to any disclaimer, the term of this patent is extended or adjusted under 35 U.S.C. 154(b) by 63 days.

(21) Appl. No.: 11/491,591

(22) Filed: Jul. 24, 2006

(65) Prior Publication Data

US 2008/0017768 A1    Jan. 24, 2008

(51) Int. Cl.
*A45D 42/14* (2006.01)
(52) U.S. Cl. .................. 248/683; 248/205.5; 248/205.7
(58) Field of Classification Search .......... 248/683, 248/686, 467, 205.5, 205.6, 205.7, 206.2, 248/309.3
See application file for complete search history.

(56) References Cited

U.S. PATENT DOCUMENTS

| 435,752 | A |  | 9/1890 | Ingersoll |  |
|---|---|---|---|---|---|
| 0,858,964 | A |  | 7/1907 | Dayton |  |
| 0,963,264 | A |  | 7/1910 | Austin |  |
| 1,076,250 | A |  | 10/1913 | Ulrich |  |
| 1,534,214 | A | * | 4/1925 | Holt | ............... 4/583 |
| 1,556,648 | A |  | 10/1925 | Symms |  |
| 1,632,856 | A |  | 6/1927 | Running |  |
| 1,718,433 | A |  | 6/1929 | Rivas |  |
| 1,749,399 | A |  | 3/1930 | Thayer |  |
| 1,800,218 | A |  | 4/1931 | Janda |  |
| 1,835,294 | A |  | 12/1931 | Charles |  |
| 1,883,791 | A |  | 10/1932 | Jewell |  |
| 1,922,900 | A |  | 8/1933 | Plante |  |
| 1,932,154 | A |  | 10/1933 | Briggs |  |
| 2,045,672 | A |  | 6/1936 | Oliveri |  |
| 2,081,992 | A | * | 6/1937 | Gavlak | ............... 4/583 |
| 2,206,159 | A |  | 7/1940 | Burgard |  |
| 2,231,230 | A |  | 2/1941 | Sturtz |  |
| 2,309,121 | A |  | 1/1943 | Keely |  |

(Continued)

FOREIGN PATENT DOCUMENTS

JP          2005/351469          12/2005

OTHER PUBLICATIONS

Asian Products, http://asianproducts.com/viewproduct-big_A10776030369121.htm, 2006, 1 page.

(Continued)

*Primary Examiner*—A. Joseph Wujciak, III

(57) ABSTRACT

A deformable device mountable by suction on a mounting surface including a body having an inner surface and a periphery. The inner surface has a concave portion and a suction portion contiguous with suction created to mount the body on the mounting surface. The inner surface includes a boundary defining the suction portion, an additional portion between the boundary and the periphery, and a bend adjacent the boundary at which the inner surface curves away from the mounting surface. The body is deformable from an undeformed shape to an actuated shape to mount the body on the mounting surface by positioning the inner surface of the undeformed body adjacent the mounting surface thereby forming a cavity and deforming the body to the actuated shape thereby sealing the body against the mounting surface and forcing fluid from the cavity to create suction between the body and the mounting surface.

70 Claims, 6 Drawing Sheets

U.S. PATENT DOCUMENTS

| | | | |
|---|---|---|---|
| 2,451,194 A | 10/1948 | Brown | |
| 2,559,163 A | 7/1951 | MacDonald | |
| 2,815,919 A | 12/1957 | Pribil | |
| 3,076,976 A * | 2/1963 | Bogar | 261/122.1 |
| 3,091,779 A * | 6/1963 | Lucas et al. | 4/583 |
| 3,241,795 A | 3/1966 | Frye | |
| 3,731,166 A | 5/1967 | Gordon | |
| 3,237,330 A | 5/1973 | Inuzuka et al. | |
| 3,736,668 A | 6/1973 | Dillarstone | |
| 3,936,025 A | 2/1976 | Cass | |
| 4,052,806 A | 10/1977 | George | |
| 4,186,502 A | 2/1980 | Foster | |
| 4,196,882 A | 4/1980 | Rognon | |
| 4,279,396 A | 7/1981 | Bendock | |
| 4,302,899 A | 12/1981 | DeHart | |
| 4,352,461 A | 10/1982 | Orta | |
| 4,426,723 A | 1/1984 | Rouse | |
| 4,528,354 A | 7/1985 | McDougal | |
| 4,588,153 A | 5/1986 | Boston | |
| 4,594,380 A | 6/1986 | Chapin | |
| 4,725,575 A | 2/1988 | Frihart | |
| 4,799,587 A | 1/1989 | Desanto | |
| 4,802,626 A | 2/1989 | Forbes | |
| 4,813,641 A | 3/1989 | Wilson | |
| D302,107 S | 7/1989 | Adams | |
| 4,848,542 A | 7/1989 | Burnette | |
| 4,848,713 A | 7/1989 | Adams | |
| 4,852,288 A | 8/1989 | Payne | |
| 4,863,129 A | 9/1989 | Adams | |
| 5,020,754 A | 6/1991 | Davis | |
| 5,042,772 A | 8/1991 | Madjeski | |
| 5,069,050 A | 12/1991 | Chen | |
| 5,077,925 A | 1/1992 | Herrera et al. | |
| 5,078,356 A | 1/1992 | Adams | |
| 5,080,941 A * | 1/1992 | Kosowan | 428/31 |
| 5,087,005 A * | 2/1992 | Holoff et al. | 248/205.8 |
| D327,215 S | 6/1992 | Pestone | |
| D327,388 S * | 6/1992 | Phillips | D6/588 |
| 5,131,177 A | 7/1992 | Sy, Jr. | |
| 5,133,524 A | 7/1992 | Liu | |
| 5,176,346 A | 1/1993 | Liu | |
| D340,181 S | 10/1993 | Adams et al. | |
| 5,253,393 A | 10/1993 | Levin | |
| 5,318,262 A | 6/1994 | Adams | |
| 5,387,622 A | 2/1995 | Yamamoto | |
| 5,405,112 A | 4/1995 | Trethewey | |
| 5,438,112 A | 8/1995 | Wong | |
| 5,492,739 A | 2/1996 | Thorne et al. | |
| 5,555,665 A | 9/1996 | Fore | |
| D376,308 S | 12/1996 | Lee | |
| 5,611,511 A | 3/1997 | Lee | |
| 5,671,849 A | 9/1997 | Bacon | |
| D388,691 S | 1/1998 | Adams | |
| 5,714,215 A * | 2/1998 | Sheffield et al. | 428/34.1 |
| 5,719,549 A | 2/1998 | Lai | |
| D401,499 S | 11/1998 | Barry | |
| 5,964,437 A | 10/1999 | Belokin et al. | |
| D416,783 S | 11/1999 | Hampshire | |
| 6,014,779 A * | 1/2000 | Lindholm | 4/583 |
| D421,213 S | 2/2000 | Addi | |
| 6,136,392 A | 10/2000 | Sheffield, Jr. et al. | |
| 6,143,391 A | 11/2000 | Barnes et al. | |
| D436,517 S | 1/2001 | Barry | |
| 6,349,445 B1 | 2/2002 | Mackay | |
| 6,367,184 B1 | 4/2002 | Kheder | |
| 6,375,143 B1 | 4/2002 | Burns | |
| 6,446,375 B1 | 9/2002 | Davis | |
| 6,561,355 B1 | 5/2003 | Forbes | |
| 6,564,397 B1 * | 5/2003 | Hawley et al. | 4/581 |
| 6,589,093 B1 | 7/2003 | Morgan | |
| 6,648,285 B1 | 11/2003 | Woollen | |
| 6,753,004 B2 | 6/2004 | Ollis | |
| 6,832,615 B2 | 12/2004 | Hensel | |
| 6,869,053 B2 | 3/2005 | Adams, IV | |
| D506,380 S | 6/2005 | Chu | |
| 7,147,171 B2 | 12/2006 | Harada | |
| 7,293,719 B2 | 11/2007 | Wheatley | |
| 2002/0116858 A1 | 8/2002 | Valencic | |
| 2004/0035997 A1 | 2/2004 | Snell | |
| 2004/0124325 A1 | 7/2004 | Kwok | |
| 2004/0211867 A1 | 10/2004 | Doyle | |
| 2004/0221498 A1 | 11/2004 | Vico et al. | |
| 2005/0077653 A1 | 4/2005 | Holger | |
| 2005/0218561 A1 | 10/2005 | Watson | |
| 2006/0032100 A1 | 2/2006 | Alvarez | |
| 2006/0104933 A1 | 5/2006 | Bell | |
| 2006/0196964 A1 | 9/2006 | Wheatley | |
| 2007/0131828 A1 | 6/2007 | Chang | |

OTHER PUBLICATIONS

Presto Galaxy Suction Cups, Inc., http://www.suctioncupsinc.com, 2006, 18 pages.

Interdesign, Sapphire Orbo Photo Frame product, 1998, 4 pages, including summary sheet describing frame product.

"Shopping Guide: The Key To Cutting The Chaos," The Florida Times-Union, Jul. 8, 2006, three pages; http://www.jacksonville.com/tu-online/stories/070806/lif_3760832.shtml.

"Comedy Central Summer," BeansTalk Biz Newsletter; Jun. 30, 2006, seven pages; http://beanstalkbiz.blogspot.com/2006_06_25_archive.html.

Fling Promotions, Ltd., the SUX, http://flingprom.com/products/html, Jan. 18, 2004 (as archived on http://webarchive.org), 6 pages.

UK Intellectual Property Office design registration for "Keyring", Design #3022611, grant date: Oct. 26, 2005, 5 pages.

Presto Galaxy Suction Cups, Inc.; http://wvvw.suctioncupsinc.com, Mar. 24, 2006, 16 pages.

* cited by examiner

SUCTION-MOUNTABLE DISPLAY DEVICE HAVING A PERIPHERY AND A BEND ADJACENT THE PERIPHERY

BACKGROUND OF THE INVENTION

The present invention relates to suction-mountable display devices and, more particularly, to suction-mountable devices having at least one bend adjacent a periphery of the device.

Most conventional vacuum-mountable devices include a flexible body having a circular periphery extending around the body. Circular bodies are common because non-symmetric reflex or spring forces develop within bodies having non-circular peripheries. When a vacuum-mountable device is deformed from an undeformed shape, reflex forces are created within its body that act to return the body to its undeformed shape. When the body is deformed and the device is mounted on a surface by vacuum, the reflex forces act to push the body away from the surface while vacuum forces created between the device body and the surface work to hold the device against the surface. The vacuum forces must be greater than the sum of the reflex forces created in the body to create and maintain a connection between the body and the surface. The reflex forces developed in non-circular bodies during deformation are generally distributed in a non-circular manner around the body. Vacuum forces between the body and mounting surface do not balance well with the non-uniform sum of the reflex forces for keeping the device mounted on the surface.

Some conventional vacuum-mountable devices having non-circular peripheries reduce the effect of non-circular reflex forces by tapering a thickness of the body towards the periphery. That is, the thickness measured between an inner surface having a concave portion and an outer surface opposite the inner surface decreases toward the periphery of the body. The reflex forces developed during deformation of tapered bodies are more uniform because there is less material nearer the periphery where the body is non-uniformly shaped. The body near the periphery contributes less to the reflex forces of the body in proportion to the decreased thickness, allowing the reflex forces distributed more uniformly around a center of the body to predominate the sum of the reflex forces. By developing more uniform reflex forces in the body, devices having a tapered thickness can securely mount on mounting surfaces. Methods of making devices having non-circular peripheries that do not require tapering of the body thickness and resulting devices are sought. Such devices could be made with a variety of periphery shapes without the need for tapering.

BRIEF SUMMARY OF THE INVENTION

The present invention relates to a deformable device mountable by suction on a generally smooth mounting surface including a body having an outer surface and a periphery extending around the body surrounding the outer surface. The body further includes an inner surface opposite the outer surface. The inner surface has a concave portion opposite the outer surface when the body is undeformed and the concave portion includes a suction portion contiguous with suction created to mount the body on the mounting surface during use. The inner surface includes a boundary defining the suction portion and an additional portion between the boundary of the suction portion and the periphery of the body. The inner surface also includes a bend adjacent the boundary at which the inner surface curves away from the mounting surface when the inner surface of the body is positioned on the mounting surface. The body is deformable from an undeformed shape to an actuated shape to mount the device on the mounting surface by positioning the inner surface of the body adjacent the mounting surface when the body is in the undeformed shape thereby forming a cavity between the suction portion and the mounting surface and deforming the body to the actuated shape thereby sealing the body against the mounting surface and forcing fluid out of the cavity to create a suction between the body and the mounting surface thereby securing the body to the mounting surface.

In another aspect, the present invention relates to a deformable device mountable by suction on a generally smooth mounting surface including a body having an outer surface and a periphery extending around the body surrounding the outer surface. The body further includes an inner surface opposite the outer surface. The inner surface has a concave portion opposite the outer surface when the body is undeformed. The concave portion has a center and includes a suction portion contiguous with suction created to mount the body on the mounting surface during use. The suction portion has a central region including the center of the concave portion. The inner surface includes a boundary defining the suction portion and an additional portion between the suction portion and the periphery. The body is deformable from an undeformed shape to an actuated shape to mount the body on the mounting surface by positioning the inner surface of the body adjacent the mounting surface when the body is in the undeformed shape thereby forming a cavity between the suction portion and the mounting surface and deforming the body to the actuated shape thereby sealing the body against the mounting surface and forcing fluid out of the cavity to create a suction between the body and the mounting surface thereby securing the body to the mounting surface. The inner surface includes a first region adjacent the central region having a tangent, a second region between the first region and the boundary having a tangent, a third region adjacent the boundary having a tangent, and a fourth region between the boundary and the periphery having a tangent. When the body is in the undeformed shape and the inner surface of the body is positioned adjacent the mounting surface, the tangent of the first region is generally parallel to the mounting surface, the tangent of the second region extends at an angle with respect to the mounting surface, the tangent of the third region extends at an angle with respect to the mounting surface that is less than the angle at which the tangent of the second region extends with respect to the mounting surface, and the tangent of the fourth region extends at an angle with respect to the mounting surface that is less than the angle at which the tangent of the third region extends with respect to the mounting surface.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
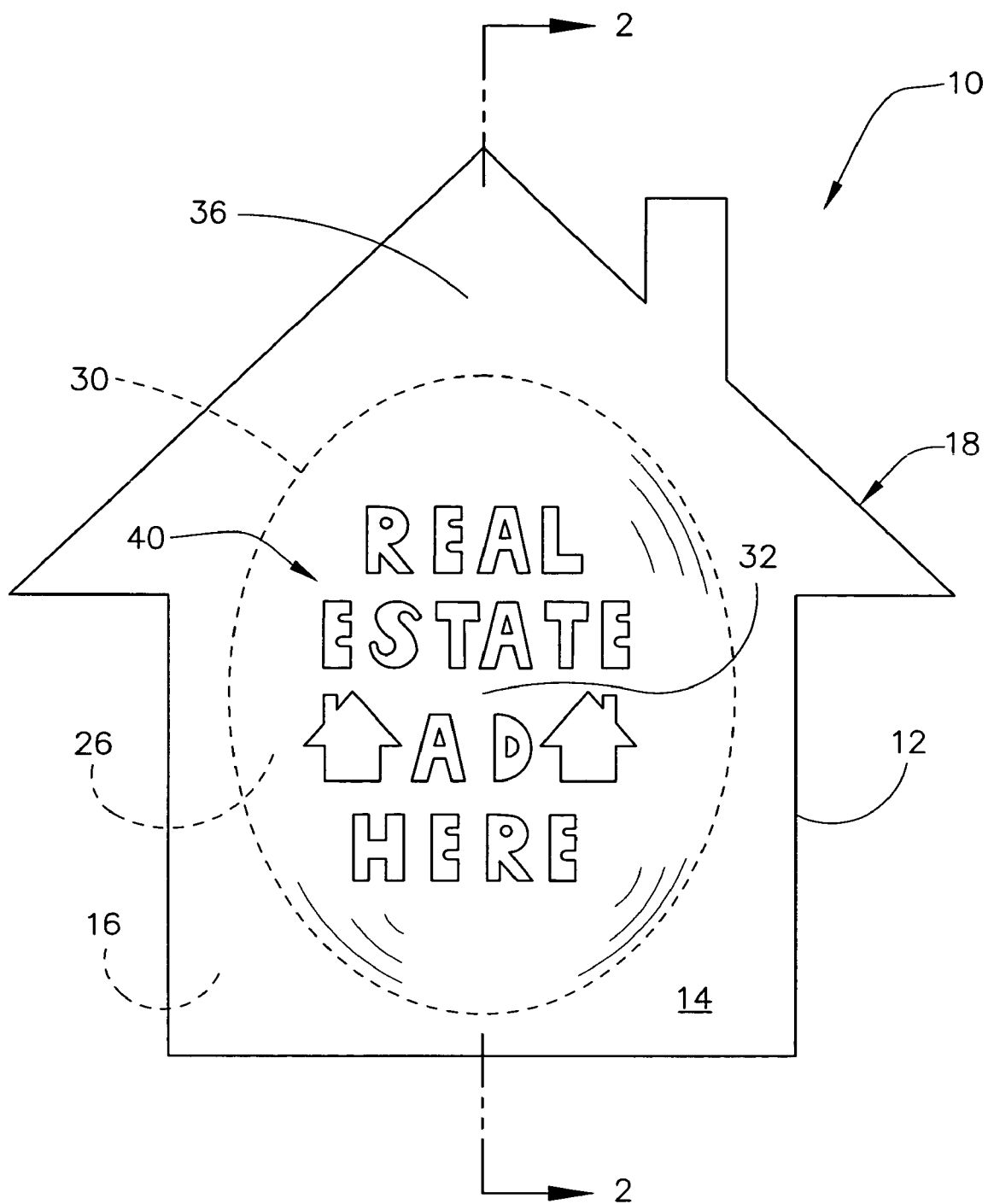
FIG. 1 is a top plan of a display device according to a first embodiment of the present invention.
Figure 2:
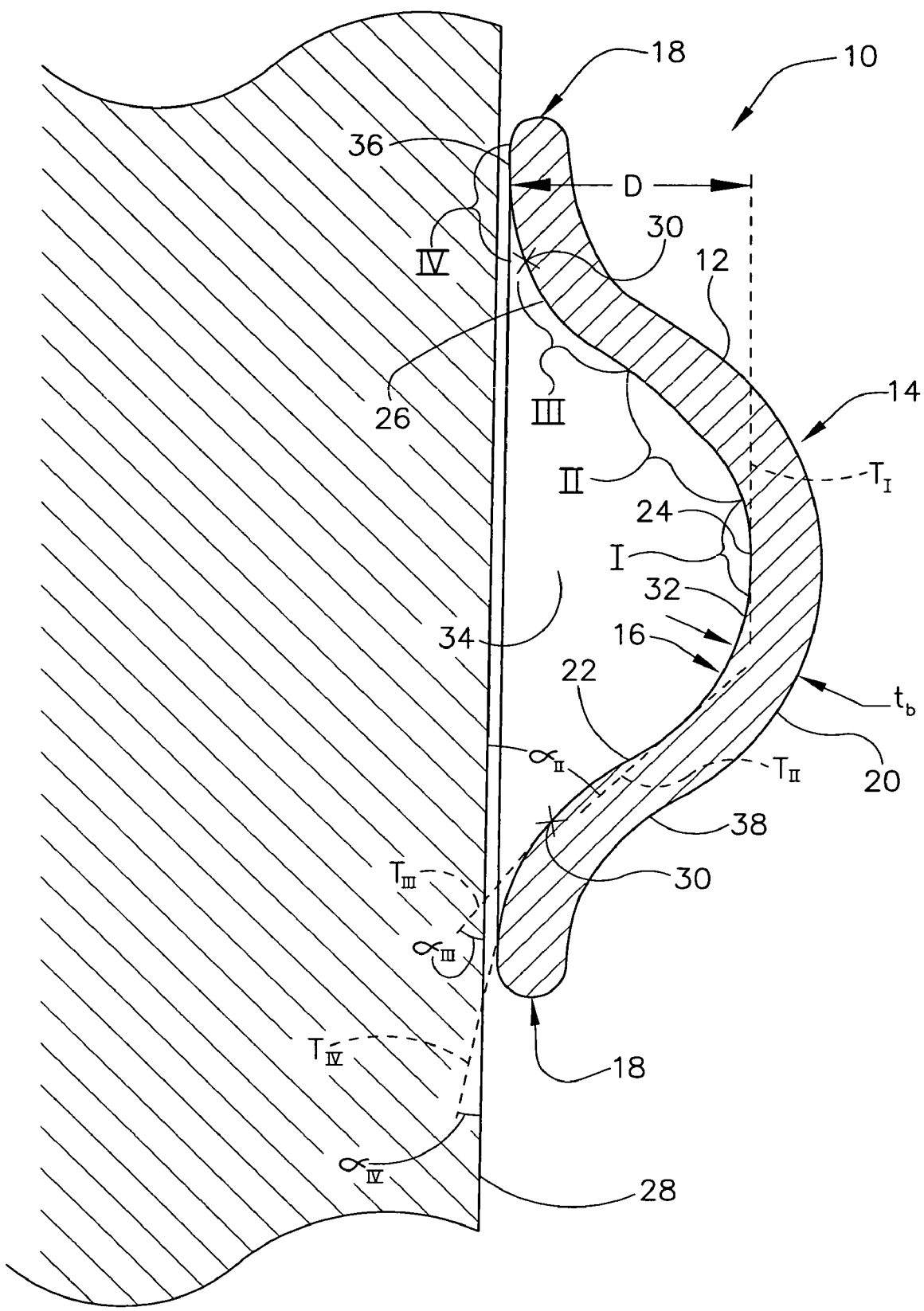
FIG. 2 is a cross section of the display device taken along line 2-2 of FIG. 1 shown in an undeformed shape adjacent a mounting surface.

Referring to the figures, and more particularly to FIG. 1, a portable display device according to a first embodiment of the present invention is designated in its entirety by reference number 10. The display device 10 has a flexible or deformable body 12 including an outer surface 14, an inner surface 16, and a periphery 18 extending around the body and surrounding the inner surface and the outer surface. Although the flexible body 12 may include other materials without departing from the scope of the present invention, in one embodiment the body includes a resinous thermoplastic such as polyvinyl chloride. As shown in FIG. 2, the outer surface 14 may include a convex portion 20. The inner surface 16 includes a concave portion 22 opposite the outer surface 14. The concave portion 22 of the inner surface 16 has a center 24. For embodiments in which the outer surface 14 includes the convex portion 20, the concave portion 22 of the inner surface 16 may be opposite the convex portion. The outer surface 14 may be substantially free of protrusions such as the central knobs protruding from outer surfaces of conventional suction cups. In one embodiment, the convex portion 20 is substantially free of protrusions. The flexible body 12 has a thickness $t_b$ measured between the outer surface 14 and the inner surface 16. The thickness $t_b$ may vary throughout the flexible body 12 or be generally constant. For example, the thickness $t_b$ may vary from a maximum thickness of between about 0.10 inch and about 0.25 inch adjacent the center 24 of the concave portion 22 and a minimum thickness of between about 0.045 inch and about 0.077 inch adjacent the periphery 18. In one embodiment, the flexible body 12 has a constant thickness $t_b$ of between about 0.083 inch and about 0.125 inch.

The inner surface 16 includes a suction portion 26 that is contiguous with suction created between the body and a generally smooth and non-porous mounting surface 28 to mount the device 10 on the mounting surface. That is, the suction portion 26 consists of the surface of the body 12 that interacts with the mounting surface 28 to create the suction that mounts the device 10 on the mounting surface. The suction portion 26 includes the concave portion 22 of the inner surface 16 and has a boundary 30 extending around and defining the suction portion. Although the boundary 30 may have other shapes without departing from the scope of the present invention, in one embodiment the boundary is generally circular or generally oval. The suction portion 26 further includes a central region 32 including the center 24 of the concave portion 22.

Figure 3:
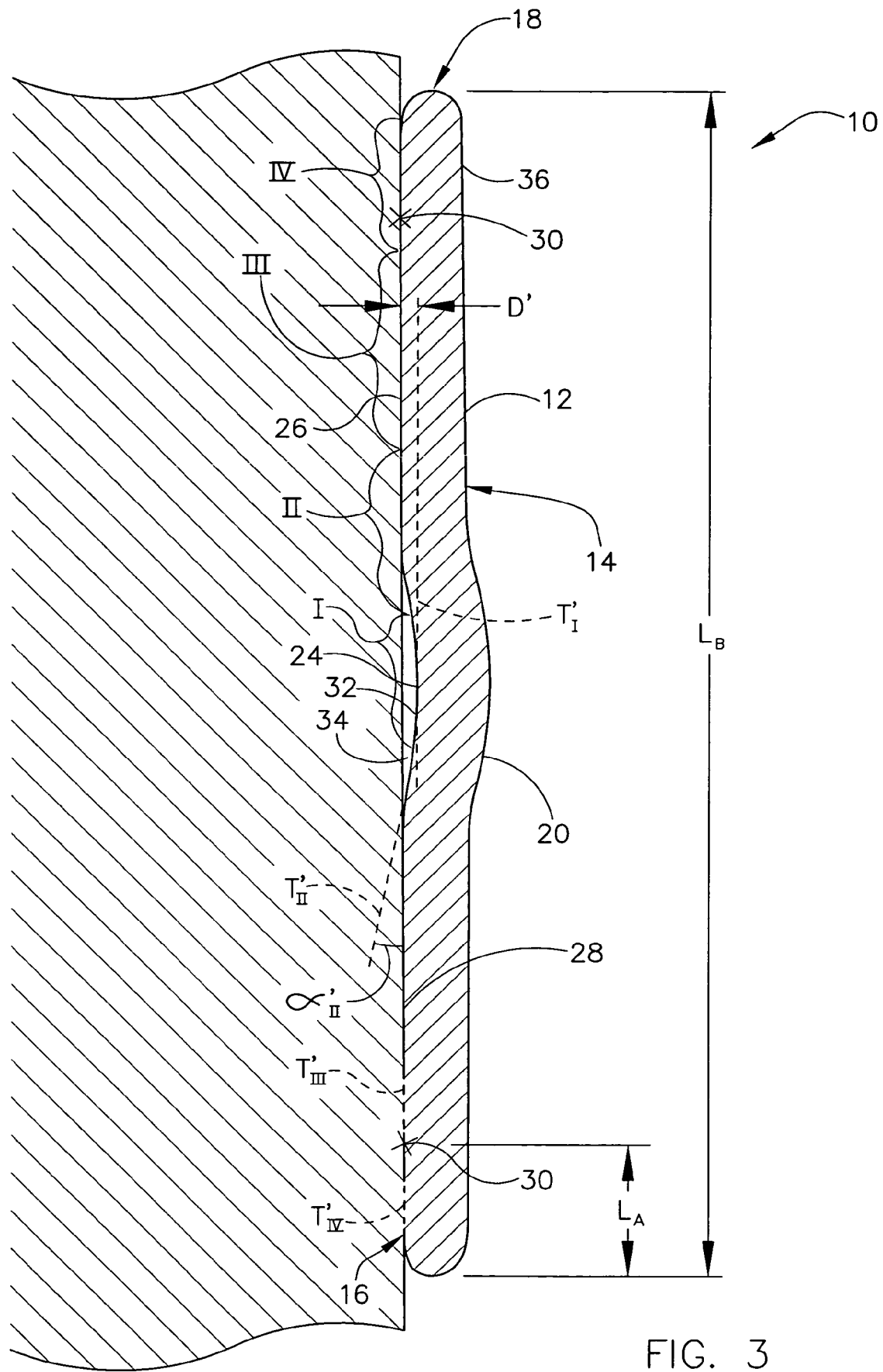
FIG. 3 is a cross section of the display device of FIG. 2 shown in an actuated shape secured to the mounting surface.

The flexible body 12 is deformable between an undeformed or default shape, shown in FIG. 2, and an actuated shape, shown in FIG. 3, to mount the display device 10 by suction or vacuum on the mounting surface 28. The display device 10 may be secured to mounting surfaces 28 having various attitudes. For example, the display device 10 may be mounted on an upward facing or downward facing horizontal mounting surface 28. The display device 10 may also be mounted on a vertical surface 28 or on a generally upward or downward facing surface that is angled between horizontal and vertical. A mounting strength of the display device 10 depends in part on the size, shape, and material of the display device 10 and characteristics of the mounting surface 28, such as smoothness.

The mounting surface 28 must include a surface area that is at least as large as the suction portion 26 spans when the flexible body 12 is in its actuated shape. To mount the display device 10 on the mounting surface 28, the inner surface 16 of the flexible body 12 is positioned adjacent the mounting surface when the body is in its default shape, as shown in FIG. 2. By positioning the flexible body 12 in this way, a cavity 34 is formed between the suction portion 26 of the body and the mounting surface 28. The inner surface 16 includes a first region I adjacent the center 24 of the concave portion 22 having a tangent $T_I$. The inner surface 16 also includes a second region II between the first region I and the boundary 30 of the suction portion 26 having a tangent $T_{II}$. When the flexible body 12 is in its undeformed shape and the inner surface 16 is positioned adjacent the mounting surface 28, the tangent $T_I$ of the first region I is generally parallel to the mounting surface and the tangent $T_{II}$ of the second region II extends at an angle $\alpha_{II}$ with respect to the mounting surface. Although the tangent $T_{II}$ of the second region II may extend with respect to the mounting surface 28 at other angles $\alpha_{II}$ (or "second angle") when the flexible body 12 is undeformed and the inner surface 16 is positioned adjacent the mounting surface, in one embodiment the tangent of the second region extends with respect to the mounting surface at an angle of between about 22° and about 30° when the flexible body is undeformed and the inner surface is positioned adjacent the mounting surface. In a particular embodiment, the tangent $T_{II}$ of the second region II extends with respect to the mounting surface 28 at an angle $\alpha_{II}$ of about 27.2° when the flexible body is undeformed and the inner surface 16 is positioned adjacent the mounting surface.

In some embodiments, the tangent $T_{II}$ of the second region II extends with respect to the mounting surface 28 at smaller angles $\alpha_{II}$ when the flexible body is undeformed, such as angles within a range extending from about 10° to about 22°. As will be appreciated by those skilled in the art, smaller second angles $\alpha_{II}$ when the flexible body is undeformed and the inner surface 16 is positioned adjacent the mounting surface 28 generally reduce suction forces that the body 12 can create between the body and the mounting surface when the body is deformed to its actuated shape adjacent the mounting surface. However, decreases in suction forces that would otherwise result from a decrease in the second angle $\alpha_{II}$ can be lowered by changing other characteristics of the body 12. For example, a body 12 having a smaller second angle $\alpha_{II}$ can create the same suction forces between the body and the mounting surface 28 as a body having a larger second angle if the body having the smaller angle $\alpha_{II}$ has a greater body thickness $t_b$ and/or is made of a more resilient material.

In some embodiments, the tangent $T_{II}$ of the second region II extends with respect to the mounting surface 28 at larger angles $\alpha_{II}$ when the flexible body is undeformed, such as angles within a range extending from about 30° to about 60°. As will be appreciated by those skilled in the art, larger second angles $\alpha_{II}$ when the flexible body is undeformed generally increase suction forces that the body 12 can create between the body and the mounting surface 28 when the body is deformed to its actuated shape and mounted on the mounting surface. However, increases in suction forces that would otherwise result from an increase in the second angle $\alpha_{II}$ can be lowered by changing other characteristics of the body 12. For example, a body 12 having a larger second angle $\alpha_{II}$ can create the same suction forces between the body and the mounting surface as a body having a smaller second angle if the body having the larger second angle $\alpha_{II}$ has a smaller body thickness $t_b$ and/or is made of a less resilient material.

Another characteristic of the body 12 that can affect the suction forces creatable by the body is the maximum depth D (shown in FIG. 2) of the body cavity 34 when the body is in the undeformed shape. Although the body 12 may have other maximum cavity depths D when the body is in the undeformed shape, in one embodiment the body has a maximum cavity depth of between about 0.25 inch and about 1.25 inches when the body is in the undeformed shape. In a particular embodiment, the body 12 has a maximum cavity depth D of about 0.563 inch when the body is undeformed.

Through experimentation and calculation, a designer of the display device 10 may identify relationships amongst characteristics of the device including the maximum depth D of the cavity 34, the thickness $t_b$ of the body, the body material, and the second angle $\alpha_{II}$ when the flexible body is undeformed and the inner surface 16 is positioned adjacent the mounting surface 28. A designer may determine that the suction forces that a body 12 can form between the body 12 and the mounting surface 28 can be increased while maintaining the same maximum cavity depth D by increasing the second angle $\alpha_{II}$. In three particular embodiments, the maximum cavity depth D is about 0.563 inch and the second angle $\alpha_{II}$ is about 22°, about 27°, and about 30° respectively. In these three embodiments, the bodies 12 having higher second angles $\alpha_{II}$ create greater suction forces when actuated and mounted on the mounting surface 28.

A designer may also determine that suction forces creatable between a body 12 and the mounting surface 28 can be the same for devices 10 having different maximum cavity depths D, body thicknesses $t_b$, body materials, and/or second angles $\alpha_{II}$. For example, as described above, a body 12 having a smaller second angle $\alpha_{II}$ can create the same suction forces between the body and the mounting surface 28 as a body having a larger second angle if the body having the smaller second angle $\alpha_{II}$ has a greater thickness $t_b$ and/or is made of a more resilient material. Further, as described above, a body 12 having a larger second angle $\alpha_{II}$ can create the same suction forces between the body and the mounting surface 28 as a body having a smaller second angle if the body having the larger second angle $\alpha_{II}$ has a smaller thickness $t_b$ and/or is made of a less resilient material.

As an additional example of a relationship that a designer may determine amongst characteristics of the device 10, a designer may determine that a device 10 having a smaller body thickness $t_b$ can create comparable suction forces as a device having a larger body thickness if the maximum cavity depth D and/or the second angle $\alpha_{II}$ of the device having the smaller body thickness are larger than the maximum cavity depth and the second angle $\alpha_{II}$ of the device having the larger body thickness. As another example, a designer may determine that devices 10 create greater suction forces when the body thickness $t_b$, the maximum cavity depth D, and the second angle $\alpha_{II}$ are increased. As will be apparent to one skilled in the art, the maximum cavity depth D, the thickness $t_b$, the body material, the second angle $\alpha_{II}$, and other device 10 characteristics, such as a maximum length $L_B$ of the body (shown in FIG. 3), may be selected by a designer to accomplish desired performance.

After the flexible body 12 is positioned adjacent the mounting surface 28 as described, the flexible body is moved to its actuated shape (i.e., causing the inner surface 16 to conform to the mounting surface), as shown in FIG. 3, thereby sealing the body against the mounting surface 28 and forcing fluid such as air out of the cavity 34 to create the suction between the body and the mounting surface. The suction created within the sealed cavity 34 secures the body 12 to the mounting surface 28. As the flexible body 12 is deformed toward the actuated shape, reflex or spring forces are created in the body between the convex and concave portions 20, 22 that act to return the body to its default shape. As will be appreciated by those skilled in the art, the flexible body 12 must be sized and shaped so forces created by the suction balance with or are greater than the sum of the reflex forces created in the body and any loading on the body to create and maintain the connection between the body and mounting surface 28.

When the flexible body 12 is in its actuated shape and mounted on the mounting surface 28, a tangent $T_I'$ of the first region I is generally parallel to the mounting surface and a tangent $T_{II}'$ of the second region II extends at an angle $\alpha_{II}'$ with respect to the mounting surface that is less than the angle $\alpha_{II}$ at which the tangent $T_{II}$ of the second region extends with respect to the mounting surface when the body is in its undeformed shape and the inner surface 16 is positioned adjacent the mounting surface. Although the tangent $T_{II}'$ of the second region II may extend at other angles $\alpha_{II}'$ with respect to the mounting surface 28 when the flexible body 12 is actuated and mounted on the mounting surface, in one embodiment the tangent of the second region extends with respect to the mounting surface at an angle of between about 1° and about 6° when the flexible body is actuated and mounted on the surface. A maximum depth D' of the body cavity 34 when the flexible body 12 is actuated and mounted on the mounting surface 28 is much less than the maximum cavity depth D of the undeformed body. Although the body 12 may have other maximum cavity depths D' when the body 12 is actuated and mounted on the mounting surface 28 without departing from the scope of the present invention, in one embodiment the body has a maximum cavity depth of between about 0.005 inch and about 0.1 inch when the body is actuated and mounted on the mounting surface. In a particular embodiment, the body 12 has a maximum cavity depth D' of between about 0.016 inch and about 0.063 inch when the body is actuated and mounted on the mounting surface 28.

As described above, through experimentation and calculation, a designer of the display device 10 may identify relationships amongst characteristics of the device. As another example, a designer may identify relationships between the second angle $\alpha_{II}'$ and the maximum cavity depth D' when the flexible body 12 is actuated and mounted on the mounting surface 28. For example, a designer may design display devices 10 so that those having higher maximum cavity depths D' also have higher second angles $\alpha_{II}'$ when the body 12 is mounted on the mounting surface. In one particular embodiment, the body 12 forms a second angle $\alpha_{II}'$ of about 1.47° and the maximum cavity depth D' is about 0.016 inch when the body is mounted on the mounting surface 28. In another embodiment the body 12 forms a second angle $\alpha_{II}'$ of about 5.85° and the cavity depth D' is about 0.063 inch when the body is mounted on the mounting surface 28.

To demount the flexible body 12 from the mounting surface 28, for example to relocate the display device 10 on another smooth mounting surface, the body is moved out of its actuated shape thereby breaking the seal and suction. To break the seal and move the body 12 out of its actuated shape, the user may move or pull on a portion of the periphery 18 of the flexible body 12.

The inner surface 16 further includes an additional portion 36 between the suction portion 26 and the periphery 18. The additional portion 36 is not needed to create the suction used to mount the device 10 on the mounting surface 28. The additional portion 36 and the periphery 18 surrounding the additional portion may have various sizes and shapes without departing from the scope of the present invention, as long as the suction between the display device 10 and the mounting surface 28 can be created and maintained as described above. FIG. 1 shows an embodiment of the display device 10 in which the periphery 18 is shaped as a house. The periphery 18 may be symmetric, such as circular, square, or oval, or non-symmetric. In one embodiment, the periphery 18 is non-circular. Other exemplary periphery 18 shapes include those corresponding to articles of clothing such as a shirt or shoe, structures such as a bridge or skyscraper, a vehicle such as a car, boat, or airplane, and articles of natures such as a fruit, flower, tree, person, or animal. Also, the body 12 may be colored or tinted as desired. For example, a body shaped as a tree (shown in FIG. 4) may be colored or tinted green and/or brown.

Although the additional portion 36 of the flexible body 12 is not needed for creating suction, reflex forces created in the additional portion during mounting of the device 10 on the mounting surface 28 can keep the device from mounting or staying mounted on the mounting surface. For some periphery 18 shapes, the reflex forces in the body 12 must be reduced in places to ensure secure mounting of the display device 10 on the mounting surface 28. One way to reduce reflex forces is by tapering body 12 thickness $t_b$, as described above. It is contemplated that reflex forces can also be reduced by varying the material or material properties of the flexible body 12 between the central region 24 and the periphery 18.

Another way to reduce reflex forces created within the flexible body 12 during use of the device 10 is for the inner surface 16 to include at least one bend 38 adjacent the boundary 30 of the suction portion 26 in which the body curves away from the mounting surface 28 when the body is undeformed and the inner surface 16 of the body is positioned next to the mounting surface. The bend 38 reduces the sum of reflex forces within the body 12 because material of the body that is bent away from the mounting surface 28 pushes less toward the mounting surface when the device 10 is mounted on the mounting surface thereby increasing a likelihood of successful mounting and decreasing a likelihood of demounting. The bend 38 may extend around the entire suction portion 26 or be positioned in one or more separate places (not shown in detail) between the suction portion and the periphery 18 to reduce reflex forces in various select parts of the body 12. The bend 38 is positioned adjacent a third region III of the inner surface 16 between the second region II and the periphery 18. The inner surface 16 further includes a fourth region IV between the third region III and the periphery 18. The third region III has a tangent $T_{III}$ and the fourth region IV has a tangent $T_{IV}$.

As shown in FIG. 2, when the flexible body 12 is in its undeformed shape and the inner surface 16 is positioned adjacent the mounting surface 28, the tangent $T_{III}$ of the third region III extends at an angle $\alpha_{III}$ (or "third angle") with respect to the mounting surface that is less than the angle $\alpha_{II}$ at which the tangent $T_{II}$ of the second region II extends with respect to the mounting surface. Although the tangent $T_{III}$ of the third region III may extend at other angles $\alpha_{III}$ with respect to the mounting surface 28 when the flexible body 12 is undeformed and the inner surface 16 is positioned adjacent the mounting surface, in one embodiment the tangent of the third region extends at an angle with respect to the mounting surface of between about 14.5° and about 27.5° when the body is undeformed and the inner surface is positioned adjacent the mounting surface. In three particular embodiments, the third angle $\alpha_{III}$ when the flexible body 12 is undeformed and the inner surface 16 is positioned adjacent the mounting surface 28 is about 14.5°, about 17°, and about 19.5°, respectively.

When the body 12 is undeformed and the inner surface 16 is positioned adjacent the mounting surface 28, the tangent $T_{IV}$ of the fourth region IV extends at an angle $\alpha_{IV}$ with respect to the mounting surface that is less than the angle $\alpha_{III}$ at which the tangent $T_{III}$ of the third region III extends with respect to the mounting surface. Although the tangent $T_{IV}$ of the fourth region IV may extend at other angles $\alpha_{IV}$ (or "fourth angles") with respect to the mounting surface 28 when the flexible body 12 is undeformed and the inner surface 16 is positioned adjacent the mounting surface, in one embodiment the tangent of the fourth region extends at an angle with respect to the mounting surface of between about 3° and about 25° when the flexible body is undeformed and the inner surface is positioned adjacent the mounting surface. In three particular embodiments, the tangent $T_{IV}$ extends with respect to the mounting surface 28 at angles $\alpha_{IV}$ of about 5°, about 10°, and about 15°, respectively, when the flexible body 12 is undeformed and the inner surface 16 is positioned adjacent the mounting surface. Although the bend 38 may change a direction of the inner surface 16 by other degrees when the flexible body 12 is undeformed, in one embodiment the bend changes the direction of the inner surface by between about 5° and about 20° when the flexible body is undeformed. In three particular embodiments, the bend 38 changes a direction of the inner surface 16 of the body 12 by about 7°, about 12°, and about 17°, respectively, when the body is undeformed and positioned adjacent the mounting surface.

As described above, through experimentation and calculation, a designer of the display device 10 may identify relationships amongst characteristics of the device. As yet another example, a designer may identify relationships between the second angle $\alpha_{II}$, the third angle $\alpha_{III}$, the fourth angle $\alpha_{IV}$, the change in direction of the inner surface 16 between the second region II and the fourth IV region, the maximum cavity depth D, the maximum length $L_B$ of the body, and the body thickness $t_b$ when the flexible body 12 is undeformed and positioned adjacent the mounting surface 28. In nine particular embodiments, the maximum body length $L_B$, the body thickness $t_b$, and the cavity depth D, are the same when the body is undeformed. For example, each of these nine embodiments may have a maximum body length $L_B$ of about 2.5 inches, a maximum cavity depth D of about 0.56, and a body thickness $t_b$ of about 0.125 inch when the body is undeformed.

In a first three embodiments of these nine embodiments (or embodiments one, two, and three), the second angle $\alpha_{II}$ is about 22°. In a second three embodiments of these nine embodiments (or embodiments four, five, and six), the second angle $\alpha_{II}$ is about 27°. In a third three embodiments of these nine embodiments (or embodiments seven, eight, and nine), the second angle $\alpha_{II}$ is about 30°. In the first, fourth, and seventh embodiments of the nine embodiments, the bodies 12 form a fourth angle $\alpha_{IV}$ of about 5° when the body is undeformed and the inner surface 16 is positioned adjacent the mounting surface. In the second, fifth, and eighth embodiments of the nine embodiments, the bodies 12 form a fourth angle $\alpha_{IV}$ of about 10° when the body is undeformed and the inner surface 16 is positioned adjacent the mounting surface. In the third, sixth, and ninth embodiments of the nine embodiments, the bodies 12 form a fourth angle $\alpha_{IV}$ of about 15° when the body is undeformed and the inner surface 16 is positioned adjacent the mounting surface. Accordingly, the bend 38 changes a direction of the inner surface 16 between the second region II and the fourth region IV by about 17°, about 12°, about 7°, about 22°, about 17°, about 12°, about 25°, about 20°, and about 15° for the first through ninth embodiments, respectively. Moreover, in these nine embodiments, the bodies 12 form third angles $\alpha_{III}$ of about 19.5°, about 17°, about 14.5°, about 24.7°, about 22.2°, about 20°, about 27.5°, about 25°, and about 22.5°, for the first through ninth embodiments, respectively, when the bodies are undeformed and the inner surfaces 16 are positioned adjacent the mounting surface.

As shown in FIG. 3, when the flexible body 12 is in its actuated shape and mounted on the mounting surface 28, a tangent $T_{III}'$ of the third region III of the inner surface 16 is generally parallel to the mounting surface. When the flexible body 12 is in its actuated shape and mounted on the mounting surface 28, a tangent $T_{IV}'$ of the fourth region IV of the inner surface 16 is generally parallel to or sloped away from the mounting surface (not shown in detail). The tangent $T_{IV}'$ of the fourth region IV slopes away from the mounting surface 28 when the bend 38 changes the direction of the inner surface 16 sufficiently when the body 12 is undeformed. Although the tangent $T_{IV}'$ of the fourth region IV may extend at other angles with respect to the mounting surface 28 when the flexible body 12 is in its actuated shape and mounted on the mounting surface, in one embodiment the tangent of the fourth region extends at an angle with respect to the mounting surface of between about 0° and about 15° when the flexible body is in its actuated shape and mounted on the mounting surface. In a particular embodiment, the tangent of the fourth region IV extends at an angle with respect to the mounting surface of about 5°.

When the tangent $T_{IV}'$ of the fourth region IV slopes away from the mounting surface 28 (i.e., forming an angle between the tangent of the fourth region and the mounting surface that is greater than zero) when the body 12 is secured to the mounting surface, a portion of the fourth region will be separated from the mounting surface by a space. Although the fourth region IV may be separated from the mounting surface 28 by other maximum spaces when the flexible body 12 is in its actuated shape and mounted on the mounting surface, in one embodiment the fourth region is separated from the mounting surface by a maximum amount of between about 0.008 inch and about 0.067 inch when the flexible body is in its actuated shape and mounted on the mounting surface. In one particular embodiment, the fourth region IV is separated from the mounting surface 28 by a maximum amount of about 0.011 inch when the flexible body 12 is in its actuated shape and mounted on the mounting surface. In another particular embodiment, the fourth region IV is separated from the mounting surface 28 by a maximum amount of about 0.022 inch when the flexible body 12 is in its actuated shape and mounted on the mounting surface.

The size of the additional portion 36 can be measured in various ways. In one embodiment, the additional portion 36 is configured so that the periphery 18 can be separated from the mounting surface 28 by a maximum clearance (not shown in detail) of between about 0.031 inch and about 0.063 inch while the device 10 is secured to the mounting surface. Although the additional portion 36 may have other maximum lengths $L_A$ (shown in FIG. 3) measured in the lateral direction (i.e., between the boundary 30 and the periphery 18) without departing from the scope of the present invention, in one embodiment the additional portion has a maximum lateral length that is at least about 6% of the maximum length $L_B$ of the body. In another embodiment, the additional portion has a maximum lateral length $L_A$ that is between about 4% and about 13% of the maximum length $L_B$ of the body. For example, in a particular embodiment, the additional portion 36 has a maximum length $L_A$ of between about 0.12 inch and about 0.25 inch and the body 12 has a maximum length $L_B$ of between about 2 inches and about 3 inches.

Although the additional portion 36 may have other masses without departing from the scope of the present invention, in one embodiment the additional portion has a mass that is at least about 7% of a total mass of the body. In another embodiment, the additional portion has a mass that is between about 6.5% and about 9.1% of the total mass of the body. For example, in a particular embodiment, the additional portion 36 has a mass of between about 0.4 gram and about 0.5 gram and the body 12 has a mass of between about 5.5 grams and about 6.0 grams.

Further, although the additional portion 36 may have other volumes without departing from the scope of the present invention, in one embodiment the additional portion has a volume that is at least about 7% of a total volume of the body. In another embodiment, the additional portion 36 has a volume that is between about 7% and about 8.5% of the total volume of the body. For example, in a particular embodiment, the additional portion 36 has a volume of between about 0.045 cubic inches and about 0.05 cubic inches and the body 12 has a volume of between about 0.60 cubic inches and about 0.63 cubic inches.

As shown in FIG. 1, the display device 10 may include a message 40 displayed on the outer surface 14 of the flexible body 12, on the inner surface 16 of the body, and/or between them. Various types of messages 40 may be displayed on or in the flexible body 12 for various reasons without departing from the scope of the present invention. For example, words, logos, and/or art may be displayed on or in the flexible body 12 for aesthetic and/or communication purposes. The message 40 may be secured to or formed in the body 12 in various ways without departing from the scope of the present invention. For example, the message 40 may be printed on the outer surface 14 or inner surface 16 of the body 12. The message 40 may also be printed on a label adhered to the outer surface 14 and the label may be fully or partially opaque, translucent, and/or transparent as desired. It is contemplated that the message 40 may be formed using material of the flexible body 12 by, for example, molding, melting, etching, or engraving the message into the outer surface 14 of the body. The message 40 may be colored as desired and, as described above, the flexible body 12 may be colored as desired. The shape of the body 12, the color of the body, the message 40, and the color of the message may be selected to relate to each another as desired. For example, in one embodiment (not shown), a golf ball inspired display device has a generally circular periphery, a message including actual dimples or a rendition of dimples printed or otherwise displayed on the outer surface of the body, and a white body.

Figure 4:
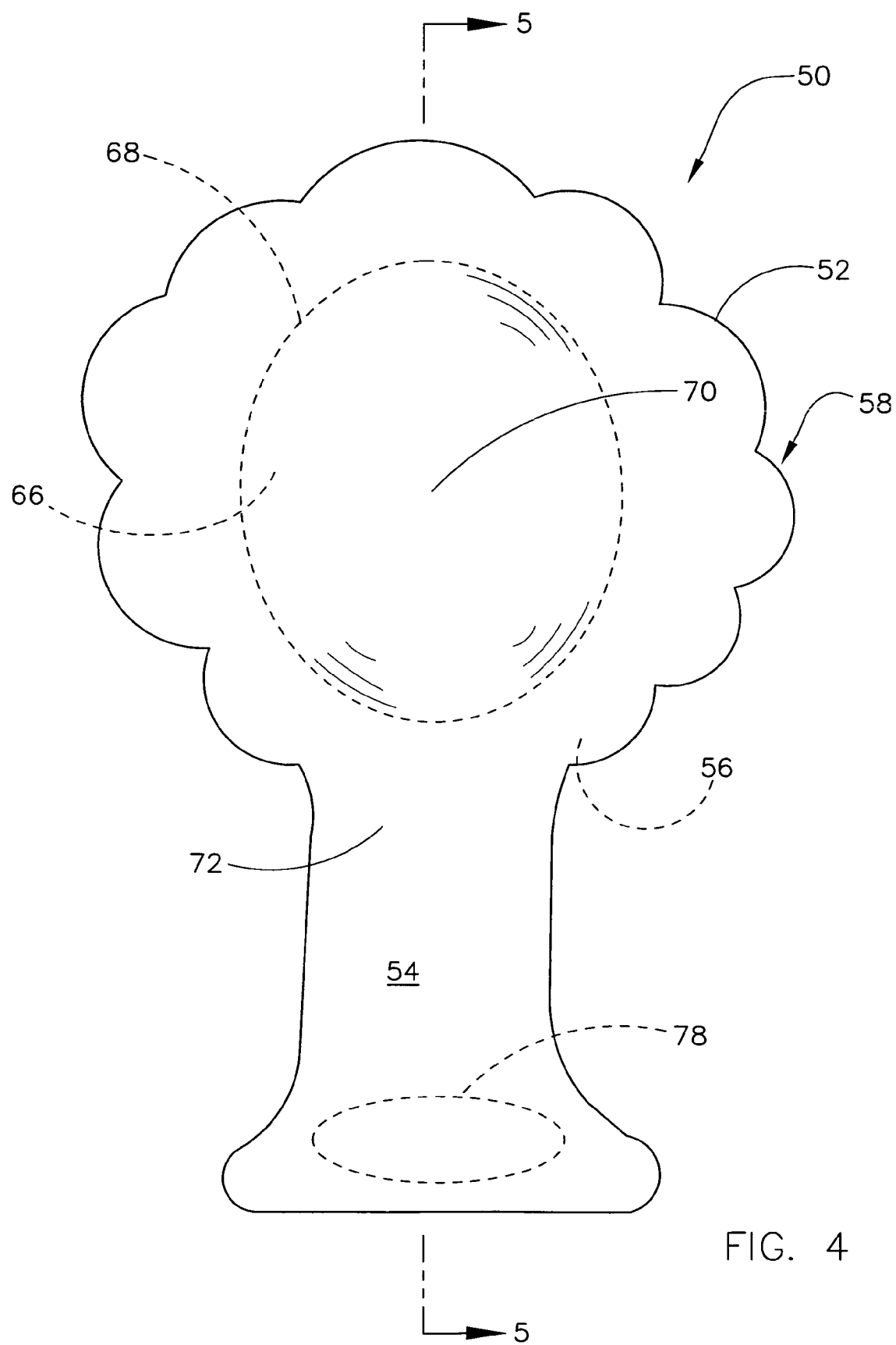
FIG. 4 is a top plan of a display device according to a second embodiment of the present invention.
Figure 5:
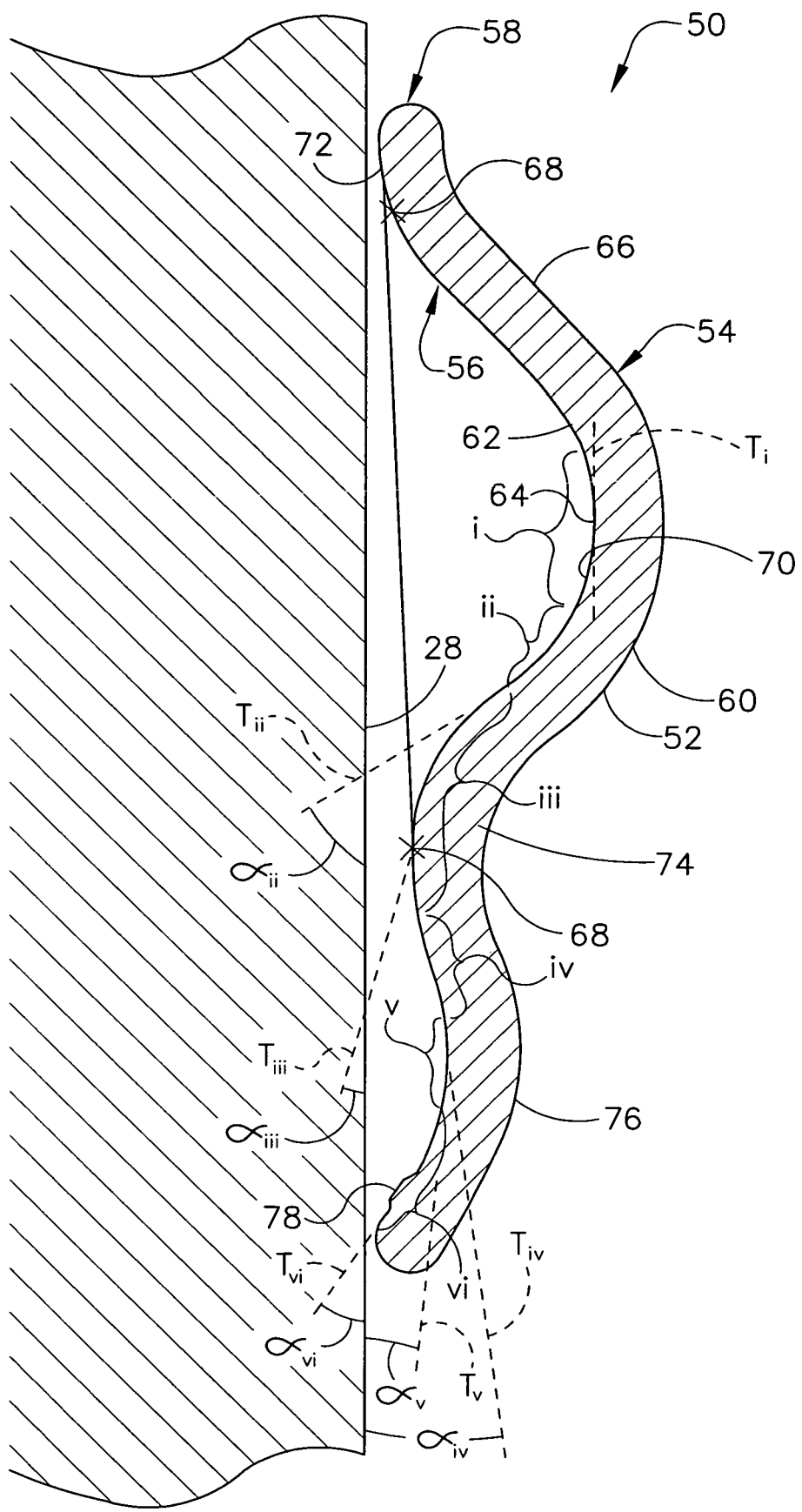
FIG. 5 is a cross section of the display device taken along line 5-5 of FIG. 4 shown in an undeformed shape adjacent the mounting surface.

FIG. 4 shows a display device 50 according to a second embodiment of the current invention. The device 50 includes a deformable or flexible body 52 including an outer surface 54, an inner surface 56, and a periphery 58 extending around the body and surrounding the inner surface and the outer surface. As shown in FIG. 5, the outer surface 54 may include a convex portion 60. The inner surface 56 includes a concave portion 62 opposite the outer surface 54. The concave portion 62 of the inner surface 56 has a center 64. For embodiments in which the outer surface 54 includes a convex portion 60, the concave portion 62 of the inner surface 56 may be opposite the convex portion. The outer surface 54 may be substantially free of protrusions. In one embodiment, the convex portion 60 is substantially free of protrusions.

The flexible body 52 includes a suction portion 66 that is contiguous with suction created between the body the mounting surface 28 to mount the device 50 on the mounting surface. That is, the suction portion 66 contains material of the body 52 that interacts with the mounting surface 28 to create the suction that mounts the device 50 on the mounting surface. The suction portion 66 includes the concave portion 62 of the inner surface 56 and has a boundary 68 extending around and defining the suction portion. Although the boundary 68 may have other shapes without departing from the scope of the present invention, in one embodiment the boundary is generally circular or generally oval. The suction portion 66 of the flexible body 52 further includes a central region 70 including the center 64 of the concave portion 62.

Figure 6:
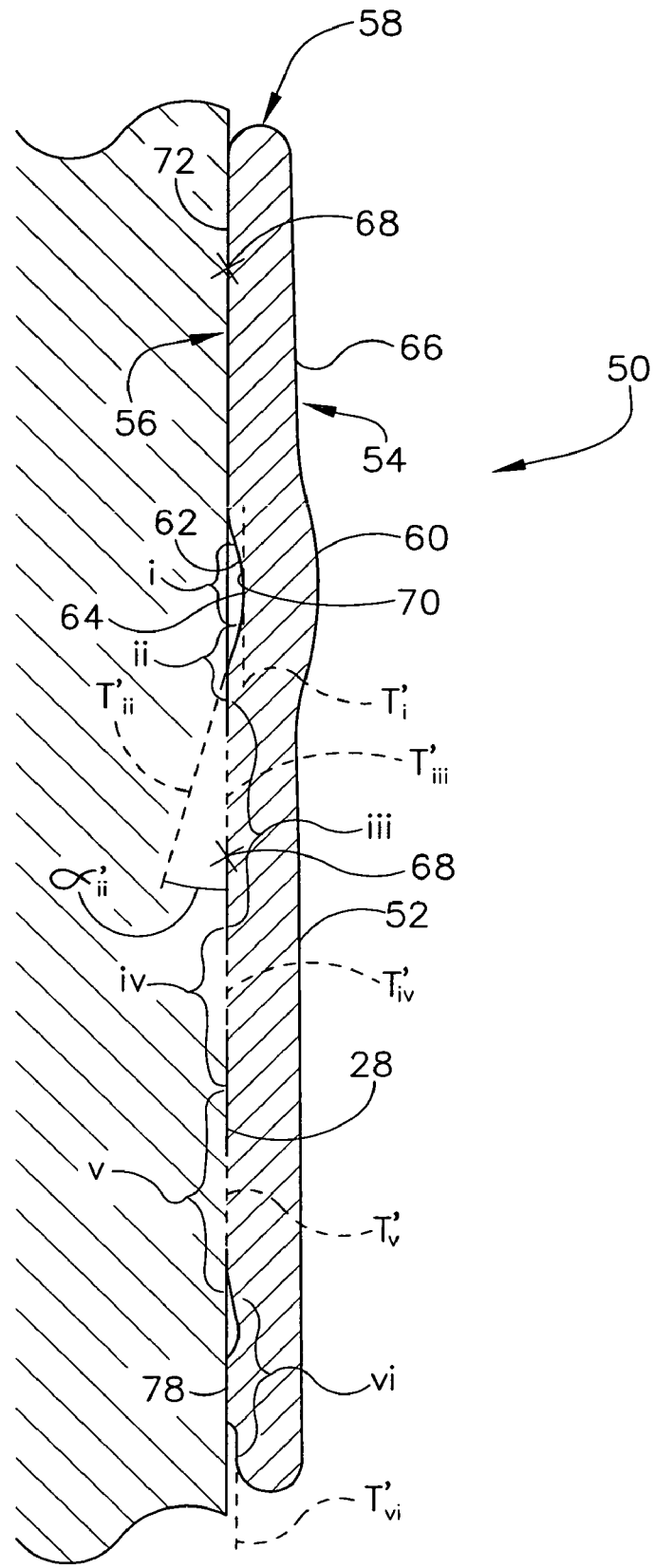
FIG. 6 is a cross section of the display device of FIG. 5 shown in an actuated shape secured to the mounting surface.

The flexible body 52 is deformable between an undeformed or default shape, shown in FIG. 5, and an actuated shape, shown in FIG. 6, to mount the display device 50 by suction or vacuum on the mounting surface 28. The inner surface 56 includes a first region i adjacent the center 64 of the concave portion 62 having a tangent $T_i$. The inner surface 56 also includes a second region ii between the first region i and the boundary 68 of the suction portion 66 having a tangent $T_{ii}$. When the flexible body 52 is in its undeformed shape and the inner surface 56 is positioned adjacent the mounting surface 28, the tangent $T_i$ of the first region i is generally parallel to the mounting surface and the tangent $T_{ii}$ of the second region ii extends at an angle $\alpha_{ii}$ with respect to the mounting surface. Although the tangent $T_{ii}$ of the second region ii may extend at other angles $\alpha_{ii}$ with respect to the mounting surface 28 when the flexible body 52 is undeformed and the inner surface 56 is positioned adjacent the mounting surface, in one embodiment the tangent of the second region at an angle extends with respect to the mounting surface of between about 22° and about 30° when the body is undeformed and the inner surface is positioned adjacent the mounting surface.

When the flexible body 52 is in its actuated shape and mounted on the mounting surface 28, a tangent $T_i'$ of the first region i is generally parallel to the mounting surface and a tangent $T_{ii}'$ of the second region ii extends at an angle $\alpha_{ii}'$ with respect to the mounting surface that is less than the angle $\alpha_{ii}$ at which the tangent $T_{ii}$ of the second region extends with respect to the mounting surface when the body is undeformed and the inner surface 56 is positioned adjacent the mounting surface. Although the tangent $T_{ii}'$ of the second region ii may extend at other angles $\alpha_{ii}'$ with respect to the mounting surface 28 when the flexible body 52 is actuated and mounted on the mounting surface, in one embodiment the tangent of the second region extends at an angle with respect to the mounting surface of between about 1° and about 6° when the flexible body is actuated and mounted on the surface.

As described above regarding the display device 10 according to the first embodiment, through experimentation and calculation a designer may identify relationships amongst characteristics of the display device 50 according to this embodiment. As an example, a designer may identify relationships between the angles $\alpha_i$, $\alpha_{ii}$, $\alpha_{iii}$, $\alpha_v$, $\alpha_{vi}$ ($\alpha_i$ not shown in detail) that the various tangents $T_i$, $T_{ii}$, $T_{iii}$, $T_{iv}$, $T_v$, $T_{vi}$ form with the mounting surface 28 when the body 52 is undeformed and the inner surface 56 is positioned adjacent the mounting surface, the angles $\alpha_i'$, $\alpha_{ii}'$, $\alpha_{iii}'$, $\alpha_{iv}'$, $\alpha_v'$, $\alpha_{vi}'$ (only $\alpha_{ii}'$ shown in detail in FIG. 6) that the various tangents $T_i'$, $T_{ii}'$, $T_{iii}'$, $T_{iv}'$, $T_v'$, $T_{vi}'$ form with the mounting surface 28 when the body is deformed and mounted on the mounting surface, the length of the body (similar to the length $L_B$ shown in FIG. 3), the thickness of the body (similar to the thickness $t_b$ shown in FIG. 3), and the material of the body.

The flexible body 52 includes an additional portion 72 between the suction portion 66 and the periphery 58. The additional portion 72 is not needed to create the suction used to mount the device 50 on the mounting surface 28. The additional portion 72 and the periphery 58 surrounding the additional portion may have various sizes and shapes without departing from the scope of the present invention, as long as the suction between the display device 50 and the mounting surface 28 can be created and maintained as described above.

FIG. 4 shows an embodiment of the display device 50 in which the periphery 58 is shaped as a tree. The periphery 58 may be symmetric, such as circular, square, or oval, or nonsymmetric. Other exemplary periphery 58 shapes include those corresponding to articles of clothing such as a shirt or shoe, structures such as a bridge or skyscraper, a vehicle such as a car, boat, or airplane, and articles of natures such as a fruit, flower, person, or animal.

Although the additional portion 72 of the flexible body 52 is not needed for creating suction, reflex forces formed in the additional portion during mounting of the device 50 on the mounting surface 28 can keep the device from mounting or staying mounted on the mounting surface. For some periphery 58 shapes, the reflex forces in the body 52 must be reduced in places to ensure secure mounting of the display device 50 on the mounting surface 28. One way to reduce reflex forces created within the flexible body 52 during use of the device is for the body to include at least one bend 74 adjacent the boundary 68 of the suction portion 66 in which the body curves away from the mounting surface 28 when body is undeformed and the inner surface 56 is positioned next to the mounting surface. Because the body 52 may include more than one bend, the bend 74 can be referred to as a first bend. The first bend 74 reduces the sum of reflex forces within the body 52 because material of the body that is bent away from the mounting surface 28 pushes less toward the mounting surface when the device 50 is mounted on the mounting surface thereby increasing a likelihood of successful mounting and decreasing a likelihood of demounting. The first bend 74 may extend around the entire suction portion 66 or be positioned in one or more separate places (not shown in detail) between the suction portion and the periphery 58 to reduce reflex forces in various select parts of the body. The first bend 74 is positioned in a third region iii of the inner surface 56 between the second region ii and the periphery 58. The inner surface 56 further includes a fourth region iv between the third region iii and the periphery 58. The third region iii has a tangent $T_{iii}$ and the fourth region iv has a tangent $T_{iv}$.

As shown in FIG. 5, the flexible body 52 may also include a second bend 76 between the first bend 74 and the periphery 58 of the flexible body. The second bend 76 may bend in the same direction as the first bend 74 (i.e., away from the mounting surface 28) or, as shown in FIG. 5, may bend in a direction opposite from a direction at which the first bend curves (i.e., toward the mounting surface). The second bend 76 is positioned in a fifth region v of the inner surface 56 between the fourth region iv and the periphery 58. The inner surface 56 further includes a sixth region vi between the fifth region v and the periphery 58. The fifth region v has a tangent $T_v$ and the sixth region vi has a tangent $T_{vi}$. When the second bend 76 curves toward the mounting surface 28 when the flexible body 52 is undeformed and the inner surface 56 is positioned adjacent the mounting surface, as shown in FIG. 5, the second bend ensures that the sixth region vi contacts the mounting surface 28 or is not greatly spaced from the mounting surface when the flexible body is mounted thereon, as shown in FIG. 6.

The flexible body 52 includes a pad 78 within the sixth region vi. In this embodiment, when the second bend 76 curves toward the mounting surface 28 when the flexible body 52 is undeformed and the inner surface 56 is positioned adjacent the mounting surface, as shown in FIG. 5, the second bend ensures that the pad 78 contacts the mounting surface 28 or is not greatly spaced from the mounting surface when the flexible body is mounted thereon, as shown in FIG. 6. The pad 78 may have various shapes without departing from the scope of the present invention. For example, as shown in FIGS. 5 and 6, the pad 78 may have a plateau shape including a generally flat portion facing the mounting surface 28 when the device 50 is mounted thereon. The pad has a footprint (shown in FIG. 4). Although the footprint of the pad 78 may have other shapes with out departing from the scope of the present invention, in one embodiment the footprint of the pad is generally rectangular, or, as shown in FIG. 4, generally oval.

As shown in FIG. 5, when the flexible body 52 is in its undeformed shape and the inner surface 56 is positioned adjacent the mounting surface 28, the tangent $T_{iii}$ of the third region iii extends at an angle $\alpha_{iii}$ with respect to the mounting surface that is less than the angle $\alpha_{ii}$ at which the tangent $T_{ii}$ of the second region extends with respect to the mounting surface. Although the tangent $T_{iii}$ of the third region iii may extend at other angles $\alpha_{iii}$ with respect to the mounting surface 28 when the flexible body 52 is undeformed and the inner surface 56 is positioned adjacent the mounting surface, in one embodiment the tangent of the third region extends at an angle with respect to the mounting surface of between about 14.5° and about 27.5° when the flexible body is undeformed and the inner surface is positioned adjacent the mounting surface.

When the body 52 is undeformed and the inner surface 56 is positioned adjacent the mounting surface 28, the tangent $T_{iv}$ of the fourth region iv extends at an angle $\alpha_{iv}$ with respect to the mounting surface that is less than the angle $\alpha_{iii}$ at which the tangent $T_{iii}$ of the third region iii extends with respect to the mounting surface. Although the tangent $T_{iv}$ of the fourth region iv may form an angle $\alpha_{iv}$ with respect to the mounting surface having a greater absolute value than the angle $\alpha_{iii}$ that the tangent $T_{iii}$ of the third region iii forms with respect to the mounting surface, the angle between the fourth tangent and the mounting surface is said to be less when it is measured in an opposite direction with respect to the mounting surface than a direction with respect to the mounting surface that the third tangent is measured, as shown in FIG. 5. Although the tangent $T_{iv}$ of the fourth region iv may extend at other angles $\alpha_{iv}$ with respect to the mounting surface 28 when the flexible body 52 is undeformed and the inner surface 56 is positioned adjacent the mounting surface, in one embodiment the tangent of the fourth region extends at an angle with respect to the mounting surface of between about 7° and about 25° when the flexible body is undeformed and the inner surface is positioned adjacent the mounting surface. Although the first bend 74 may change a direction of the inner surface 56 by other degrees when the flexible body 52 is undeformed, in one embodiment the first bend changes the direction of the inner surface by between about 5° and about 15° when the flexible body is undeformed.

When the flexible body 52 is undeformed and the inner surface 56 is positioned adjacent the mounting surface 28, the tangent $T_v$ of the fifth region v extends at an angle $\alpha_v$ with respect to the mounting surface that is greater than the angle $\alpha_{iv}$ at which the tangent $T_{iv}$ of the fourth region extends with respect to the mounting surface. Although the tangent $T_v$ of the fifth region v may extend at other angles $\alpha_v$ with respect to the mounting surface 28 when the flexible body 52 is undeformed and the inner surface 56 is positioned adjacent the mounting surface, in one embodiment the tangent of the fifth region extends at an angle with respect to the mounting surface of between about 14.5° and about 27.5° when the flexible body is undeformed and the inner surface is positioned adjacent the mounting surface.

When the body 52 is undeformed and the inner surface 56 is positioned adjacent the mounting surface 28, the tangent $T_{vi}$ of the sixth region vi extends at an angle $\alpha_{vi}$ with respect to the mounting surface that is greater than the angle $\alpha_v$ at which the tangent $T_v$ of the fifth region v extends with respect to the mounting surface. Although the tangent $T_{vi}$ of the sixth region may extend at other angles $\alpha_{vi}$ with respect to the mounting surface 28 when the flexible body 52 is undeformed and the inner surface 56 is positioned adjacent the mounting surface, in one embodiment the tangent of the sixth region extends at an angle with respect to the mounting surface of between about 22° and about 35° when the flexible body is undeformed and the inner surface is positioned adjacent the mounting surface. Although the second bend 76 may change a direction of the inner surface 56 by other degrees when the flexible body 52 is undeformed, in one embodiment the second bend changes the direction of the inner surface by between about 5° and about 15° when the flexible body is undeformed.

As shown in FIG. 6, when the flexible body 52 is in its actuated shape and mounted on the mounting surface 28, a tangent $T_{iii}'$ of the third region iii of the inner surface 56 is generally parallel to the mounting surface. When the flexible body 52 is in its actuated shape and mounted on the mounting surface 28, the tangent $T_{iv}'$ of the fourth region iv of the inner surface 56 is generally parallel to or sloped away from the mounting surface (not shown in detail). The tangent $T_{iv}'$ of the fourth region iv slopes away from the mounting surface 28 when the first bend 74 changes the direction of the inner surface 56 sufficiently when the body 12 is undeformed. Although the tangent $T_{iv}'$ of the fourth region iv of the inner surface 56 may extend at other angles with respect to the mounting surface 28 when the flexible body 52 is in its actuated shape and mounted on the mounting surface, in one embodiment the tangent of the fourth region extends at an angle with respect to the mounting surface of between about 0° and about 6° when the flexible body is in its actuated shape and mounted on the mounting surface. When the tangent $T_{iv}'$ of the fourth region iv slopes away from the mounting surface 28 (i.e., forming an angle between the tangent of the fourth region and the mounting surface that is greater than zero) while secured to the mounting surface, a portion of the flexible body 52 adjacent the second bend 76 is separated from the mounting surface by a space. Although the second bend 76 may be separated from the mounting surface 28 by other maximum spaces when the flexible body 52 is in its actuated shape and mounted on the mounting surface, in one embodiment the second bend is separated from the mounting surface by a maximum space of between about 0.016 inch and about 0.063 inch when the flexible body is in its actuated shape and mounted on the mounting surface.

When the flexible body 52 is in its actuated shape and mounted on the mounting surface 28, a tangent $T_v'$ of the fifth region v of the inner surface 56 may be generally parallel to the mounting surface. When the flexible body 52 is in its actuated shape and mounted on the mounting surface 28, the tangent $T_{vi}'$ of the sixth region vi of the inner surface 56 may also be generally parallel to the mounting surface as well. In embodiments in which the first bend 74 curves far from the mounting surface and/or the second bend 76 curves little toward the mounting surface or away from the mounting surface, the tangent $T_{vi}$ in the sixth region vi may extend away from the mounting surface. Although the tangent $T_{vi}'$ of the sixth region vi of the inner surface 56 may extend away from the mounting surface 28 at other angles (not shown in detail) with respect to the mounting surface when the flexible body 52 is in its actuated shape and mounted on the mounting surface, in one embodiment the tangent of the sixth region extends away from the mounting surface at an angle of between about 0° and about 6° with respect to the mounting surface when the flexible body is in its actuated shape and mounted on the mounting surface. In embodiments of the device 50 in which the tangent $T_{vi}'$ of the sixth region vi slopes away from the mounting surface 28 when the body 52 is actuated and secured to the mounting surface, the sixth region will be separated from the mounting surface by a space. Although the sixth region vi may be separated from the mounting surface 28 by other maximum clearances when the flexible body 52 is in its actuated shape and mounted on the mounting surface, in one embodiment the periphery is separated from the mounting surface by a maximum clearance of between about 0.016 inch and about 0.063 inch when the flexible body is in its actuated shape and mounted on the mounting surface. The display device 50 is otherwise identical to the display device 10 of the first embodiment and therefore will not be described in further detail.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A deformable device mountable by suction on a generally smooth mounting surface comprising a body including:
   an outer surface;
   a periphery extending around the body surrounding the outer surface; and
   an inner surface opposite said outer surface, said inner surface having a concave portion opposite said outer surface when the body is undeformed, said concave portion including a suction portion contiguous with suction created to mount the body on said mounting surface during use, said inner surface including a boundary defining said suction portion and an additional portion between said boundary of said suction portion and said periphery of the body, said inner surface including a bend adjacent said boundary at which the inner surface curves away from the mounting surface when the inner surface of the body is positioned on the mounting surface;
   wherein the body is deformable from an undeformed shape to an actuated shape to mount the body on the mounting surface by positioning the inner surface of the body adjacent the mounting surface when the body is in the undeformed shape thereby forming a cavity between said suction portion and the mounting surface and deforming the body to its actuated shape thereby sealing the body against the mounting surface and forcing fluid out of the cavity to create suction between the body and the mounting surface thereby securing the body to the mounting surface;
   wherein said bend adjacent the boundary of the suction portion is a first bend and the inner surface further includes a second bend between said first bend and said periphery in which the additional portion of the body curves in a direction that is opposite from a bending direction of the first bend; and
   wherein the body further comprises a pad between said second bend and said periphery contacting said mounting surface when the device is mounted on the mounting surface.

2. A device as set forth in claim 1 wherein said outer surface is substantially free of protrusions.

3. A device as set forth in claim 1 wherein the periphery varies from circular.

4. A device as set forth in claim 1 wherein the device is configured so that said periphery and the mounting surface are separable by a maximum clearance of between about 0.016 inch and about 0.063 inch while the body is secured to the mounting surface.

5. A device as set forth in claim 1 wherein the body is configured so that substantially alt of the inner surface between the boundary and the periphery contacts the mounting surface when the body is in the actuated shape and secured to the mounting surface.

6. A device as set forth in claim 1 wherein:
   any tangent of the inner surface extends at angle with respect to the mounting surface when the body is in its undeformed shape and the inner surface is positioned adjacent the mounting surface; and
   the angle of each such tangent varies from the angle of every other such tangent by about 85° or less.

7. A device as set forth in claim 1 wherein a thickness measured between said inner surface and said outer surface is generally constant throughout the body.

8. A device as set forth in claim 1 wherein a thickness measured between said inner surface and said outer surface tapers from a maximum thickness within the suction portion to a minimum thickness at the periphery.

9. A deformable device mountable by suction on a generally smooth mounting surface comprising:
   a body including:
      an outer surface;
      a periphery extending around the body surrounding the outer surface; and
      an inner surface opposite said outer surface, said inner surface having a concave portion opposite said outer surface when the body is undeformed, said concave portion having a center and including a suction portion contiguous with suction created to mount the body on said mounting surface during use, the suction portion having a central region including said center of the concave portion, the inner surface including a boundary defining the suction portion and an additional portion between the suction portion and the periphery;
   wherein the body is deformable from an undeformed shape to an actuated shape to mount the body on the mounting surface by positioning the inner surface of the body adjacent the mounting surface when the body is in the undeformed shape thereby forming a cavity between said suction portion and the mounting surface and deforming the body to its actuated shape thereby sealing the body against the mounting surface and forcing fluid out of the cavity to create a suction between the body and the mounting surface thereby securing the body to the mounting surface;
   wherein tangents of the inner surface extend at corresponding angles with respect to the mounting surface when the inner surface is positioned adjacent the mounting surface and each angle of said angles varies from each other angle of said angles by about 85° or less when the body is in the undeformed shape;
   wherein the inner surface includes:
      a first region adjacent the central region having a first tangent of said tangents;
      a second region between the first region and the boundary having a second tangent of said tangents;
      a third region adjacent the boundary having a third tangent of said tangents; and
      a fourth region between the boundary and the periphery having a fourth tangent of said tangents;

wherein, when the body is in its undeformed shape and said inner surface of the body is positioned adjacent the mounting surface:
the first tangent is generally parallel to the mounting surface;
the second tangent extends at a second angle with respect to the mounting surface;
the third tangent extends at a third angle with respect to the mounting surface that is less than the second angle; and
the fourth tangent extends at a fourth angle with respect to the mounting surface that is less than the third angle; and
wherein the body is configured so that when the body is in the actuated shape and mounted on the mounting surface:
the first tangent is generally parallel to the mounting surface;
an angle at which the second tangent extends with respect to the mounting surface is less than the angle at which the tangent of the second region extends with respect to the mounting surface when the body is in the undeformed shape and the inner surface of the body is positioned adjacent the mounting surface; and
the third tangent of said third region is generally parallel to the mounting surface.

10. A device as set forth in claim 9 wherein a thickness measured between said inner surface and said outer surface is generally constant throughout the body or tapers from a maximum thickness within the suction portion to a minimum thickness at the periphery.

11. A device as set forth in claim 9 wherein, when the body is in the actuated shape and mounted on the mounting surface, said fourth tangent is sloped away from the mounting surface.

12. A device as set forth in claim 9 wherein:
the inner surface includes a fifth region between the fourth region and the periphery having a fifth tangent and a sixth region between the fifth region and the periphery having a sixth tangent; and
when the body is in the undeformed shape and the inner surface is positioned adjacent the mounting surface:
the fifth tangent extends at an angle with respect to the mounting surface that is greater than the fourth angle; and
the sixth tangent extends at an angle with respect to the mounting surface that is greater than the fifth angle.

13. A device as set fourth in claim 12 wherein, when the body is in the actuated shape and mounted on the mounting surface:
the first tangent is generally parallel to the mounting surface;
an angle at which the second tangent extends with respect to the mounting surface is less than the angle at which the second tangent extends with respect to the mounting surface when the body is in the undeformed shape and the inner surface of the body is positioned adjacent the mounting surface;
the third tangent is generally parallel to the mounting surface;
the fourth tangent is generally parallel to or sloped away from the mounting surface;
the fifth tangent is generally parallel to the mounting surface; and
the sixth tangent is generally parallel to the mounting surface.

14. A device as set forth in claim 9 wherein each angle of said angles varies from each other angle of said angles by less than about 57° when the body is in the undeformed shape.

15. A device as set forth in claim 9 wherein said outer surface is substantially free of protrusions.

16. A device as set forth in claim 9 wherein the periphery varies from circular.

17. A device as set forth in claim 9 wherein the body is configured so that substantially all of the inner surface between the boundary and the periphery contacts the mounting surface when the body is in the actuated shape and secured to the mounting surface.

18. A device as set forth in claim 9 wherein a thickness measured between said inner surface and said outer surface is generally constant throughout the body.

19. A device as set forth in claim 9 wherein a thickness measured between said inner surface and said outer surface tapers from a maximum thickness within the suction portion to a minimum thickness at the periphery.

20. A deformable device mountable by suction on a generally smooth mounting surface comprising:
a body including:
an outer surface;
a periphery extending around the body surrounding the outer surface; and
an inner surface opposite said outer surface, said inner surface having a concave portion opposite said outer surface when the body is undeformed, said concave portion having a center and including a suction portion contiguous with suction created to mount the body on said mounting surface during use, the suction portion having a central region including said center of the concave portion, the inner surface including a boundary defining the suction portion and an additional portion between the suction portion and the periphery;
wherein the body is deformable from an undeformed shape to an actuated shape to mount the body on the mounting surface by positioning the inner surface of the body adjacent the mounting surface when the body is in the undeformed shape thereby forming a cavity between said suction portion and the mounting surface and deforming the body to its actuated shape thereby sealing the body against the mounting surface and forcing fluid out of the cavity to create a suction between the body and the mounting surface thereby securing the body to the mounting surface;
wherein the inner surface includes:
a first region adjacent the central region having a first tangent;
a second region between the first region and the boundary having a second tangent;
a third region adjacent the boundary having a third tangent; and
a fourth region between the boundary and the periphery having a fourth tangent;
a fifth region between the fourth region and the periphery having a fifth tangent; and
a sixth region between the fifth region and the periphery having a sixth tangent;
wherein, when the body is in its undeformed shape and said inner surface of the body is positioned adjacent the mounting surface:
the first tangent is generally parallel to the mounting surface;
the second tangent extends at a second angle with respect to the mounting surface;

the third tangent extends at a third angle with respect to the mounting surface that is less than the second angle; and the fourth tangent extends at a fourth angle with respect to the mounting surface that is less than the third angle;

the fifth tangent extends at an angle with respect to the mounting surface that is greater than the fourth angle;

the sixth tangent extends at an angle with respect to the mounting surface that is greater than the fifth angle; and wherein the body further comprises a pad in the sixth region contacting said mounting surface when the device is mounted on the mounting surface.

21. A device as set forth in claim 20 wherein said outer surface is substantially free of protrusions.

22. A device as set forth in claim 20 wherein the periphery varies from circular.

23. A device as set forth in claim 20 wherein the body is configured so that substantially all of the inner surface between the boundary and the periphery contacts the mounting surface when the body is in the actuated shape and secured to the mounting surface.

24. A device as set forth in claim 20 wherein:
every tangent of the inner surface, including said first, second, third, and fourth inner-surface tangents, extends at a corresponding angle with respect to the mounting surface when the body is in its undeformed shape and the inner surface is positioned adjacent the mounting surface; and
each angle of said angles varies from each other angle of said angles by about 85° or less.

25. A device as set forth in claim 20 wherein a thickness measured between said inner surface and said outer surface is generally constant throughout the body.

26. A device as set forth in claim 20 wherein a thickness measured between said inner surface and said outer surface tapers from a maximum thickness within the suction portion to a minimum thickness at the periphery.

27. A deformable device mountable by suction on a generally smooth mounting surface comprising:
a body including:
an outer surface;
a periphery extending around the body surrounding the outer surface; and
an inner surface opposite said outer surface, said inner surface having a concave portion opposite said outer surface when the body is undeformed, said concave portion having a center and including a suction portion contiguous with suction created to mount the body on said mounting surface during use, the suction portion having a central region including said center of the concave portion, the inner surface including a boundary defining the suction portion and an additional portion between the suction portion and the periphery;
wherein a thickness measured between the inner surface and the outer surface tapers from a maximum thickness adjacent the center of the concave portion to a minimum thickness at the periphery;
wherein the body is deformable from an undeformed shape to an actuated shape to mount the body on the mounting surface by positioning the inner surface of the body adjacent the mounting surface when the body is in the undeformed shape thereby forming a cavity between said suction portion and the mounting surface and deforming the body to its actuated shape thereby sealing the body against the mounting surface and forcing fluid out of the cavity to create a suction between the body and the mounting surface thereby seeming the body to the mounting surface;

wherein the inner surface includes:
a first inner region adjacent the central region having a first inner tangent;
a second inner region between the first inner region and the boundary having a second inner tangent;
a third inner region adjacent the boundary having a third inner tangent; and
a fourth inner region between the boundary and the periphery having a fourth inner tangent;

wherein, when the body is in its undeformed shape and said inner surface of the body is positioned adjacent the mounting surface:
the first inner tangent is generally parallel to the mounting surface;
the second inner tangent extends at a second inner angle with respect to the mounting surface;
the third inner tangent extends at a third inner angle with respect to the mounting surface that is less than the second inner angle; and
the fourth inner tangent extends at a fourth inner angle with respect to the mounting surface that is less than the third inner angle; and wherein the outer surface includes:
a first outer region opposite the first inner region, the first outer region having a first outer tangent being substantially parallel to the first inner tangent;
a second outer region opposite the second inner region, the second outer region having a second outer tangent being substantially parallel to the second inner tangent;
a third outer region opposite the third inner region, the third outer region having a third outer tangent being substantially parallel to the third inner tangent; and
a fourth outer region opposite the fourth inner region, the fourth outer region having a fourth outer tangent being substantially parallel to the fourth inner tangent.

28. A device as set forth in claim 27 wherein:
the inner surface further includes:
a fifth inner region between the fourth inner region and the periphery, the inner surface in the fifth region having a fifth inner tangent; and
a sixth inner region between the fifth region of the inner surface and the periphery, the inner surface in the sixth region having a sixth inner tangent;
when the body is in the undeformed shape and the inner surface is positioned adjacent the mounting surface:
the fifth inner tangent extends at a fifth inner angle with respect to the mounting surface that is greater than the fourth inner angle; and
the sixth inner tangent extends at an inner angle with respect to the mounting surface that is greater than the fifth inner angle; and
the outer surface further includes:
a fifth outer region opposite the fifth inner region the fifth outer region having a fifth outer tangent being substantially parallel to the fifth inner tangent; and
a sixth outer region opposite the sixth inner region, the sixth outer region having a sixth outer tangent being substantially parallel to the sixth inner tangent.

29. A device as set forth in claim 27 wherein said outer surface is substantially free of protrusions.

30. A device as set forth in claim 27 wherein the periphery varies from circular.

31. A device as set forth in claim 27 wherein:
every tangent of the inner surface, including said first, second, third, and fourth inner-surface tangents, extends at a corresponding angle with respect to the mounting surface when the body is in its undeformed shape and the inner surface is positioned adjacent the mounting surface; and
each angle of said angles varies from each other angle of said angles by about 85° or less.

32. A deformable device mountable by suction on a generally smooth mounting surface comprising a body including:
an outer surface;
a periphery extending around the body surrounding the outer surface; and
an inner surface opposite said outer surface, said inner surface having a concave portion opposite said outer surface when the body is undeformed, said concave portion including a suction portion contiguous with suction created to mount the body on said mounting surface during use, said inner surface including a boundary defining said suction portion and an additional portion between said boundary of said suction portion and said periphery of the body;
wherein said inner surface includes an inner-surface bend adjacent said boundary at which the inner surface curves away from the mounting surface when the inner surface of the body is positioned on the mounting surface;
wherein said outer surface includes an outer-surface bend corresponding to and opposite the inner-surface bend; and
wherein the body is deformable from an undeformed shape to an actuated shape to mount the body on the mounting surface by positioning the inner surface of the body adjacent the mounting surface when the body is in the undeformed shape thereby forming a cavity between said suction portion and the mounting surface and deforming the body to its actuated shape thereby sealing the body against the mounting surface and forcing fluid out of the cavity to create suction between the body and the mounting surface thereby securing the body to the mounting surface; and
wherein the body is configured to have one or more characteristics selected from a group of characteristics consisting of:
a mass of the additional portion is at least about 7% of a mass of the body; and
a distance between said boundary and said periphery is at least about 6% of a maximum length of the body;
wherein the body is configured so that when the body is in the undeformed shape a first tangent of the inner surface within the inner-surface bend is generally parallel to the mounting surface; and
wherein the body is configured so that when the body is in the actuated shape and mounted on the mounting surface said first tangent of the inner surface of the body is generally parallel to the mounting surface.

33. A device as set forth in claim 32 wherein the body is configured so that substantially all of the inner surface between the boundary and the periphery contacts the mounting surface when the body is in the actuated shape and secured to the mounting surface.

34. A device as set forth in claim 32 wherein tangents of the inner surface, including said first tangent, extend at corresponding angles with respect to the mounting surface when the inner surface is positioned adjacent the mounting surface and each angle of said angles varies from each other angle of said angles by about 85° or less when the body is in the undeformed shape.

35. A device as set forth in claim 32 wherein the periphery varies from circular.

36. A device as set forth in claim 32 wherein said inner-surface bend adjacent the boundary of the suction portion is a first inner-surface bend and the inner surface further includes a second inner-surface bend between said first inner-surface bend and said periphery in which the inner surface of the additional portion of the body curves in a direction that is opposite from a bending direction of the first inner-surface bend.

37. A device as set forth in claim 32 wherein said outer-surface bend is a first outer-surface bend and the outer surface further includes a second outer-surface bend between said first outer-surface bend and said periphery in which the outer surface of the additional portion of the body curves in a direction that is opposite from a bending direction of the first outer-surface bend.

38. A device as set forth in claim 32 wherein a thickness measured between said inner surface and said outer surface is generally constant throughout the body.

39. A device as set forth in claim 32 wherein a thickness measured between said inner surface and said outer surface tapers from a maximum thickness within the suction portion to a minimum thickness at the periphery.

40. A device as set forth in claim 32 wherein said outer surface is substantially free of protrusions.

41. A deformable device mountable by suction on a generally smooth mounting surface comprising:
a body including:
an outer surface;
a periphery extending around the body surrounding the outer surface; and
an inner surface opposite said outer surface, said inner surface having a concave portion opposite said outer surface when the body is undeformed, said concave portion having a center and including a suction portion contiguous with suction created to mount the body on said mounting surface during use, the suction portion having a central region including said center of the concave portion, the inner surface including a boundary defining the suction portion and an additional portion between the suction portion and the periphery;
wherein the body is deformable from an undeformed shape to an actuated shape to mount the body on the mounting surface by positioning the inner surface of the body adjacent the mounting surface when the body is in the undeformed shape thereby forming a cavity between said suction portion and the mounting surface and deforming the body to its actuated shape thereby sealing the body against the mounting surface and forcing fluid out of the cavity to create a suction between the body and the mounting surface thereby securing the body to the mounting surface;
wherein the inner surface includes:
a first region adjacent the central region having a first tangent of said tangents;
a second region between the first region and the boundary having a second tangent of said tangents;
a third region adjacent the boundary having a third tangent of said tangents; and
a fourth region between the boundary and the periphery having a fourth tangent of said tangents;

wherein, when the body is in its undeformed shape and said inner surface of the body is positioned adjacent the mounting surface:
the first tangent is generally parallel to the mounting surface;
the second tangent extends at a second angle with respect to the mounting surface;
the third tangent extends at a third angle with respect to the mounting surface that is less than the second angle; and
the fourth tangent extends at a fourth angle with respect to the mounting surface that is less than the third angle; and
wherein the body is configured so that substantially all of the inner surface between the boundary and the periphery contacts the mounting surface when the body is in the actuated shape and secured to the mounting surface.

42. A device as set forth in claim 41 wherein said outer surface is substantially free of protrusions.

43. A device as set forth in claim 41 wherein the periphery varies from circular.

44. A device as set forth in claim 41 wherein:
the inner surface includes a fifth region between the fourth region and the periphery having a fifth tangent and a sixth region between the fifth region and the periphery having a sixth tangent; and
when the body is in the undeformed shape and the inner surface is positioned adjacent the mounting surface:
the fifth tangent extends at an angle with respect to the mounting surface that is greater than the fourth angle; and
the sixth tangent extends at an angle with respect to the mounting surface that is greater than the fifth angle.

45. A device as set forth in claim 41 wherein:
every tangent of the inner surface, including said first, second, third, and fourth inner-surface tangents, extends at a corresponding angle with respect to the mounting surface when the body is in its undeformed shape and the inner surface is positioned adjacent the mounting surface; and
each angle of said angles varies from each other angle of said angles by about 85° or less.

46. A device as set forth in claim 41 wherein a thickness measured between said inner surface and said outer surface is generally constant throughout the body.

47. A device as set forth in claim 41 wherein a thickness measured between said inner surface and said outer surface tapers from a maximum thickness within the suction portion to a minimum thickness at the periphery.

48. A deformable device mountable by suction on a generally smooth mounting surface comprising:
a body including:
an outer surface;
a periphery extending around the body surrounding the outer surface; and
an inner surface opposite said outer surface, said inner surface having a concave portion opposite said outer surface when the body is undeformed, said concave portion having a center and including a suction portion contiguous with suction created to mount the body on said mounting surface during use, the suction portion having a central region including said center of the concave portion, the inner surface including a boundary defining the suction portion and an additional portion between the suction portion and the periphery;
wherein a thickness measured between the inner surface and the outer surface tapers from a maximum thickness adjacent the center of the concave portion within the suction portion to a minimum thickness at the periphery;
wherein the body is deformable from an undeformed shape to an actuated shape to mount the body on the mounting surface by positioning the inner surface of the body adjacent the mounting surface when the body is in the undeformed shape thereby forming a cavity between said suction portion and the mounting surface and deforming the body to its actuated shape thereby sealing the body against the mounting surface and forcing fluid out of the cavity to create a suction between the body and the mounting surface thereby securing the body to the mounting surface;
wherein the inner surface includes:
a first region adjacent the central region having a first tangent of said tangents;
a second region between the first region and the boundary having a second tangent of said tangents;
a third region adjacent the boundary having a third tangent of said tangents; and
a fourth region between the boundary and the periphery having a fourth tangent of said tangents; and
wherein, when the body is in its undeformed shape and said inner surface of the body is positioned adjacent the mounting surface:
the first tangent is generally parallel to the mounting surface;
the second tangent extends at a second angle with respect to the mounting surface;
the third tangent extends at a third angle with respect to the mounting surface that is less than the second angle; and
the fourth tangent extends at a fourth angle with respect to the mounting surface that is less than the third angle.

49. A device as set forth in claim 48 wherein:
every tangent of the inner surface, including said first, second, third, and fourth inner-surface tangents, extends at a corresponding angle with respect to the mounting surface when the body is in its undeformed shape and the inner surface is positioned adjacent the mounting surface; and
each angle of said angles varies from each other angle of said angles by about 85° or less.

50. A device as set forth in claim 48 wherein the body is configured so that substantially all of the inner surface between the boundary and the periphery contacts the mounting surface when the body is in the actuated shape and secured to the mounting surface.

51. A device as set forth in claim 48 wherein said outer surface is substantially free of protrusions.

52. A device as set forth in claim 48 wherein the periphery varies from circular.

53. A device as set forth in claim 48 wherein:
the inner surface includes a fifth region between the fourth region and the periphery having a fifth tangent and a sixth region between the fifth region and the periphery having a sixth tangent; and
when the body is in the undeformed shape and the inner surface is positioned adjacent the mounting surface:
the fifth tangent extends at an angle with respect to the mounting surface that is greater than the fourth angle; and
the sixth tangent extends at an angle with respect to the mounting surface that is greater than the fifth angle.

54. A deformable device mountable by suction on a generally smooth mounting surface comprising:
  a body including:
    an outer surface;
    a periphery extending around the body surrounding the outer surface; and
    an inner surface opposite said outer surface, said inner surface having a concave portion opposite said outer surface when the body is undeformed, said concave portion having a center and including a suction portion contiguous with suction created to mount the body on said mounting surface during use, the suction portion having a central region including said center of the concave portion, the inner surface including a boundary defining the suction portion and an additional portion between the suction portion and the periphery;
  wherein the body is deformable from an undeformed shape to an actuated shape to mount the body on the mounting surface by positioning the inner surface of the body adjacent the mounting surface when the body is in the undeformed shape thereby forming a cavity between said suction portion and the mounting surface and deforming the body to its actuated shape thereby sealing the body against the mounting surface and forcing fluid out of the cavity to create a suction between the body and the mounting surface thereby securing the body to the mounting surface;
  wherein the inner surface includes:
    a first region adjacent the central region having a first tangent;
    a second region between the first region and the boundary having a second tangent;
    a third region adjacent the boundary having a third tangent; and
    a fourth region between the boundary and the periphery having a fourth tangent;
    a fifth region between the fourth region and the periphery having a fifth tangent; and
    a sixth region between the fifth region and the periphery having a sixth tangent; and
  wherein, when the body is in its undeformed shape and said inner surface of the body is positioned adjacent the mounting surface:
    the first tangent is generally parallel to the mounting surface;
    the second tangent extends at a second angle with respect to the mounting surface;
    the third tangent extends at a third angle with respect to the mounting surface that is less than the second angle; and
    the fourth tangent extends at a fourth angle with respect to the mounting surface that is less than the third angle;
    the fifth tangent extends at an angle with respect to the mounting surface that is greater than the fourth angle; and
    the sixth tangent extends at an angle with respect to the mounting surface that is greater than the fifth angle.

55. A device as set forth in claim 54 wherein, when the body is undeformed and the inner surface is positioned adjacent the mounting surface, the outer surface includes:
  a first outer region opposite the first inner region, the first outer region having a first outer tangent being substantially parallel to the first inner tangent;
  a second outer region opposite the second inner region, the second outer region having a second outer tangent being substantially parallel to the second inner tangent;
  a third outer region opposite the third inner region, the third outer region having a third outer tangent being substantially parallel to the third inner tangent; and
  a fourth outer region opposite the fourth inner region, the fourth outer region having a fourth outer tangent being substantially parallel to the fourth inner tangent.

56. A device as set forth in claim 53 wherein the body is configured so that substantially all of the inner surface between the boundary and the periphery contacts the mounting surface when the body is in the actuated shape and secured to the mounting surface.

57. A device as set forth in claim 54 wherein a thickness measured between the inner surface and the outer surface is generally constant throughout the body or tapers from a maximum thickness adjacent the center of the concave portion to a minimum thickness at the periphery.

58. A device as set forth in claim 54 wherein said outer surface is substantially free of protrusions.

59. A device as set forth in claim 54 wherein the periphery varies from circular.

60. A device as set forth in claim 54 wherein:
  every tangent of the inner surface, including said first, second, third, and fourth inner-surface tangents, extends at a corresponding angle with respect to the mounting surface when the body is in its undeformed shape and the inner surface is positioned adjacent the mounting surface; and
  each angle of said angles varies from each other angle of said angles by about 85° or less.

61. A device as set forth in claim 54 wherein:
  every tangent of the inner surface, including said first, second, third, and fourth inner-surface tangents, extends at a corresponding angle with respect to the mounting surface when the body is in its undeformed shape and the inner surface is positioned adjacent the mounting surface; and
  each angle of said angles varies from each other angle of said angles by about 85° or less.

62. A device as set forth in claim 54 wherein a thickness measured between said inner surface and said outer surface is generally constant throughout the body.

63. A device as set forth in claim 54 wherein a thickness measured between said inner surface and said outer surface tapers from a maximum thickness within the suction portion to a minimum thickness at the periphery.

64. A deformable device mountable by suction on a generally smooth mounting surface comprising:
  a body including:
    an outer surface;
    a periphery extending around the body surrounding the outer surface; and
    an inner surface opposite said outer surface, said inner surface having a concave portion opposite said outer surface when the body is undeformed, said concave portion having a center and including a suction portion contiguous with suction created to mount the body on said mounting surface during use, the suction portion having a central region including said center of the concave portion, the inner surface including a boundary defining the suction portion and an additional portion between the suction portion and the periphery;
  wherein the body is deformable from an undeformed shape to an actuated shape to mount the body on the mounting surface by positioning the inner surface of the body adjacent the mounting surface when the body is in the undeformed shape thereby forming a cavity between said suction portion and the mounting surface and deforming the body to its actuated shape thereby sealing the body against the mounting surface and forcing fluid out of the cavity to create a suction between the body and the mounting surface thereby securing the body to the mounting surface;

wherein the inner surface includes:
- a first region adjacent the central region having a first tangent of said tangents;
- a second region between the first region and the boundary having a second tangent of said tangents;
- a third region adjacent the boundary having a third tangent of said tangents; and
- a fourth region between the boundary and the periphery having a fourth tangent of said tangents;

wherein, when the body is in its undeformed shape and said inner surface of the body is positioned adjacent the mounting surface:
- the first tangent is generally parallel to the mounting surface;
- the second tangent extends at a second angle with respect to the mounting surface;
- the third tangent extends at a third angle with respect to the mounting surface that is less than the second angle; and
- the fourth tangent extends at a fourth angle with respect to the mounting surface that is less than the third angle;

wherein, when the body is undeformed and the inner surface is positioned adjacent the mounting surface, the outer surface includes:
- a first outer region opposite the first inner region, the first outer region having a first outer tangent being substantially parallel to the first inner tangent;
- a second outer region opposite the second inner region, the second outer region having a second outer tangent being substantially parallel to the second inner tangent;
- a third outer region opposite the third inner region, the third outer region having a third outer tangent being substantially parallel to the third inner tangent; and
- a fourth outer region opposite the fourth inner region, the fourth outer region having a fourth outer tangent being substantially parallel to the fourth inner tangent;

wherein the body is configured so that substantially all of the inner surface between the boundary and the periphery contacts the mounting surface when the body is in the actuated shape and secured to the mounting surface.

65. A device as set forth in claim 64 wherein said outer surface is substantially free of protrusions.

66. A device as set forth in claim 64 wherein the periphery varies from circular.

67. A device as set forth in claim 64 wherein:
the inner surface includes a fifth region between the fourth region and the periphery having a fifth tangent and a sixth region between the fifth region and the periphery having a sixth tangent; and when the body is in the undeformed shape and the inner surface is positioned adjacent the mounting surface:
- the fifth tangent extends at an angle with respect to the mounting surface that is greater than the fourth angle; and
- the sixth tangent extends at an angle with respect to the mounting surface that is greater than the fifth angle.

68. A device as set forth in claim 64 wherein a thickness measured between said inner surface and said outer surface is generally constant throughout the body.

69. A device as set forth in claim 64 wherein a thickness measured between said inner surface and said outer surface tapers from a maximum thickness within the suction portion to a minimum thickness at the periphery.

70. A device as set forth in claim 64 wherein:
every tangent of the inner surface, including said first, second, third, and fourth inner-surface tangents, extends at a corresponding angle with respect to the mounting surface when the body is in its undeformed shape and the inner surface is positioned adjacent the mounting surface; and each angle of said angles varies from each other angle of said angles by about 85° or less.

* * * * *